(12) United States Patent
Levandoski et al.

(10) Patent No.: US 10,331,649 B2
(45) Date of Patent: Jun. 25, 2019

(54) TRANSACTIONAL ACCESS TO RECORDS ON SECONDARY STORAGE IN AN IN-MEMORY DATABASE

(71) Applicant: Microsoft Corporation, Redmond, WA (US)

(72) Inventors: Justin Jon Levandoski, Seattle, WA (US); Per-Ake Larson, Redmond, WA (US); Ahmed Eldawy, St. Paul, MN (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1379 days.

(21) Appl. No.: 14/318,672

(22) Filed: Jun. 29, 2014

(65) Prior Publication Data
US 2015/0379060 A1 Dec. 31, 2015

(51) Int. Cl.
*G06F 17/30* (2006.01)
*G06F 16/23* (2019.01)
*G06F 16/25* (2019.01)
*G06F 16/21* (2019.01)

(52) U.S. Cl.
CPC ........ *G06F 16/2322* (2019.01); *G06F 16/214* (2019.01); *G06F 16/25* (2019.01)

(58) Field of Classification Search
None
See application file for complete search history.

(56) References Cited

U.S. PATENT DOCUMENTS

| 2001/0013087 A1 | 8/2001 | Ronstrom |
| 2002/0087501 A1* | 7/2002 | Breitbart ........... G06F 17/30575 |
| 2008/0133456 A1 | 6/2008 | Richards et al. |

(Continued)

OTHER PUBLICATIONS

Levandoski, et al., "Identifying Hot and Cold Data in Main-Memory Databases", Retrieved at: <<http://research.microsoft.com/pubs/176690/ColdDataClassification-icde2013-cr.pdf>>, In IEEE 29th International Conference on Data Engineering, Apr. 8, 2013, 12 pages.

(Continued)

*Primary Examiner* — Tyler J Torgrimson
(74) *Attorney, Agent, or Firm* — Medley, Behrens & Lewis, LLC

(57) ABSTRACT

Various technologies described herein pertain to accessing records of an in-memory database. A memory can include a primary storage and a data store can include a secondary storage. The primary storage includes a first subset of the records of the database, and the secondary storage includes a second subset of the records of the database. Moreover, the memory includes an update memo that includes timestamp notices. The timestamp notices specify statuses of records of the database having updates that span the primary storage and the secondary storage. The memory further includes a database management system that is executable by a processor. The database management system processes a transaction. Further, the database management system includes a storage interface component that accesses a record of the database for the transaction based on at least one of the timestamp notices of the update memo.

20 Claims, 11 Drawing Sheets

(56) References Cited

U.S. PATENT DOCUMENTS

| | | | |
|---|---|---|---|
| 2011/0258225 A1* | 10/2011 | Taylor | G06F 17/30336 707/769 |
| 2012/0095958 A1* | 4/2012 | Pereira | G06F 17/30029 707/609 |
| 2012/0317337 A1 | 12/2012 | Johar et al. | |
| 2012/0324447 A1* | 12/2012 | Huetter | G06F 9/5066 718/1 |
| 2013/0159286 A1* | 6/2013 | Manzano Macho | G06F 17/30457 707/718 |
| 2014/0006401 A1 | 1/2014 | Levandoski et al. | |

OTHER PUBLICATIONS

Garcia-Molina, et al., "Main Memory Database Systems: An Overview", Retrieved at: <<http://citeseerx.ist.psu.edu/viewdoc/download;jsessionid=4E1CDCB086DE291F3A7EFD7E647B5296?doi=10.1.1.121.9554&rep=rep1&type=pdf>>, In IEEE Transactions on Knowledge and Data Engineering, vol. 4 Issue 6, Dec. 1992, 8 pages.

Levandoski, Justin, "Ranking and New Database Architectures", Retrieved at: <<http://db.disi.unitn.eu/pages/VLDBProgram/pdf/DBRank/dbrank2013-invited2.pdf>>, In Proceedings of the 7th International Workshop on Ranking in Databases, Aug. 30, 2013, 4 pages.

Gottstein, et al., "Aspects of Append-Based Database Storage Management on Flash Memories", Retrieved at: <<https://www.google.co.in/url?sa=t&rct=j&q=&esrc=s&source=web&cd=3&ved=0CD8QFjAC&url=http%3A%2F%2Fwww.thinkmind.org%2Fdownload.php%3Farticleid%3Ddbkda_2013_5_20_30027&ei=kK86U6_ZDsumrQfk6IGQAg&usg=AFQjCNE0fHphxaUab-5C9ogt_Y--hTuFtw>>, In 5th International Conference on Advances in Databases, Knowledge, and Data Applications, Jan. 27, 2013, 5 pages.

Gukal, et al., "Transient Versioning for Consistency and Concurrency in Client-Server Systems", Retrieved at: <<http://ieeexplore.ieee.org/stamp/stamp.jsp?tp=&arnumber=568688>>, In 4th International Conference on Parallel and Distributed Information Systems, Dec. 18, 1996, 12 pages.

Alexiou, et al., "Adaptive Range Filters for Cold Data: Avoiding Trips to Siberia", Retrieved at: <<http://www.vldb.org/pvldb/vol6/p1714-kossmann.pdf >>, In Proceedings of the VLDB Endowment, vol. 6, Issue 14, Aug. 26, 2013, pp. 1714-1725.

Dean, Jeff, "Challenges in Building Large-Scale Information Retrieval Systems", Retrieved at: <<http://research.google.com/people/jeff/WSDM09-keynote.pdf>>, In Proceedings of the Second ACM International Conference on Web Search and Data Mining, Feb. 9, 2009, 77 pages.

Debrabant, et al., "Anti-Caching: A New Approach to Database Management System Architecture", Retrieved at: <<http://hstore.cs.brown.edu/papers/hstore-anticaching.pdf >>, In Proceedings of the VLDB Endowment, vol. 6, Issue 4, Aug. 26, 2013, 1942-1953.

Diaconu, et al., "Hekaton: SQL Server's Memory-Optimized OLTP Engine", Retrieved at: <<http://dl.acm.org/citation.cfm?id=2463710 >>, In Proceedings of the ACM SIGMOD International Conference on Management of Data, Jun. 22, 2013, pp. 1243-1254.

Funke, et al., "Compacting Transactional Data in Hybrid OLTP & OLAP Databases", Retrieved at: <<http://vldb.org/pvldb/vol5/p1424_florianfunke_vldb2012.pdf>>, In Proceedings of the VLDB Endowment, vol. 5, No. 11, Aug. 27, 2012, pp. 1424-1435.

Grund, et al., "HYRISE—A Main Memory Hybrid Storage Engine", Retrieved at: <<http://www.vldb.org/pvldb/vol4/p105-grund.pdf >>, In Proceedings of the VLDB Endowment, vol. 4, No. 2, Nov. 2010, pp. 105-116.

Harizopoulos, et al., "OLTP Through the Looking Glass, and What We Found There", Retrieved at: <<http://static.cs.brown.edu/courses/csci2270/papers/looking-glass.pdf >>, In Proceedings of the ACM SIGMOD International Conference on Management of Data, Jun. 9, 2008, 12 pages.

Kallman, et al., "H-Store: A High-Performance, Distributed Main Memory Transaction Processing System", Retrieved at: <<http://www.vldb.org/pvldb/1/1454211.pdf>>, In Proceedings of the VLDB Endowment, vol. 1, Issue 2, Aug. 23, 2008, pp. 1496-1499.

Kemper, et al., "HyPer: A Hybrid OLTP & OLAP Main Memory Database System Based on Virtual Memory Snapshots", Retrieved at: <<http://ieeexplore.ieee.org/stamp/stamp.jsp?tp=&arnumber=5767867 >>, In Proceedings of the IEEE 27th International Conference on Data Engineering, Apr. 11, 2011, pp. 195-206.

Lahiri, et al., "Oracle TimesTen: An In-Memory Database for Enterprise Applications", Retrieved at: <<http://sites.computer.org/debull/A13june/TimesTen1.pdf >>, In Bulletin of the IEEE Computer Society Technical Committee on Data Engineering, vol. 36, No. 2, Jun. 2013, pp. 6-13.

Larson, et al., "High-Performance Concurrency Control Mechanisms for Main-Memory Databases", Retrieved at: <<http://arxiv.org/pdf/1201.0228.pdf >>, In Proceedings of the VLDB Endowment, vol. 5, Issue 4, 2011, pp. 298-309.

Lee, et al., "High-Performance Transaction Processing in SAP HANA", Retrieved at: <<http://www.cs.cmu.edu/~pavlo/courses/fall2013/static/papers/icdebulletin_hana.pdf>>, In Bulletin of the IEEE Computer Society Technical Committee on Data Engineering, vol. 36, No. 2, Jun. 2013, pp. 28-33.

Levandoski, et al., "Identifying Hot and Cold Data in Main-Memory Databases", Retrieved at: <<http://research.microsoft.com/pubs/176690/ColdDataClassification-icde2013-cr.pdf >>, In Proceedings of 29th IEEE International Conference on Data Engineering, Apr. 8, 2013, pp. 1-12.

Levandoski, et al., "The Bw-Tree: A B-tree for New Hardware Platforms", Retrieved at: <<http://research.microsoft.com/pubs/178758/bw-tree-icde2013-final.pdf >>, In Proceedings of IEEE 29th International Conference on Data Engineering, Apr. 8, 2012, 12 pages.

Lindstrom, et al., "IBM solidDB: In-Memory Database Optimized for Extreme Speed and Availability", Retrieved at: <<http://citeseerx.ist.psu.edu/viewdoc/download;jsessionid=9760581889EA8499C053C6D7B18B64C0?doi=10.1.1.310.6098&rep=rep1&type=pdf >>, In Bulletin of the IEEE Computer Society Technical Committee on Data Engineering, vol. 36, No. 2, Jun. 2013, pp. 14-20.

Michael, Maged M., "High Performance Dynamic Lock-Free Hash Tables and List-Based Sets", Retrieved at: <<http://citeseerx.ist.psu.edu/viewdoc/download?doi=10.1.1.114.5854&rep=rep1&type=pdf>>, In Proceedings of the Fourteenth Annual ACM Symposium on Parallel Algorithms and Architectures, Aug. 10, 2002, pp. 73-82.

Stoica, et al., "Enabling Efficient OS Paging for Main-Memory OLTP Databases", Retrieved at: <<http://www.inf.ufpr.br/carmem/oficinaBD/artigos2s2013/a7-stoica.pdf >>, In Proceedings of the Ninth International Workshop on Data Management on New Hardware, Jun. 24, 2013, 7 pages.

Stonebraker, et al., "The End of an Architectural Era (Its Time for a Complete Rewrite)", Retrieved at: <<http://nms.csail.mit.edu/~stavros/pubs/hstore.pdf>>, In Proceedings of the 33rd International Conference on Very Large Data Bases, Sep. 23, 2007, 10 pages.

Stonebraker, et al., "The VoltDB Main Memory DBMS", Retrieved at: <<http://citeseerx.ist.psu.edu/viewdoc/download?doi=10.1.1.310.9242&rep=rep1&type=pdf >>, In Bulletin of the IEEE Computer Society Technical Committee on Data Engineering, vol. 36, No. 2, Jun. 2013, pp. 21-27.

Thomson, et al., "Calvin: Fast Distributed Transactions for Partitioned Database Systems", Retrieved at: <<http://citeseerx.ist.psu.edu/viewdoc/download?doi=10.1.1.310.9242&rep=rep1&type=pdf>>, In Proceedings of the ACM SIGMOD International Conference on Management of Data, May 20, 2012, 12 pages.

"SQLIO Disk Subsystem Benchmark Tool", Retrieved on: Apr. 7, 2014 Available at: http://aka.ms/Naxvpm.

Sidirourgos, Lefteris, "Space Efficient Indexes for the Big Data Era", Retrieved at: <<http://dare.uva.nl/document/522766>>, Dissertation, FNWI: Informatics Institute, May 14, 2014, 184 Pages.

\* cited by examiner

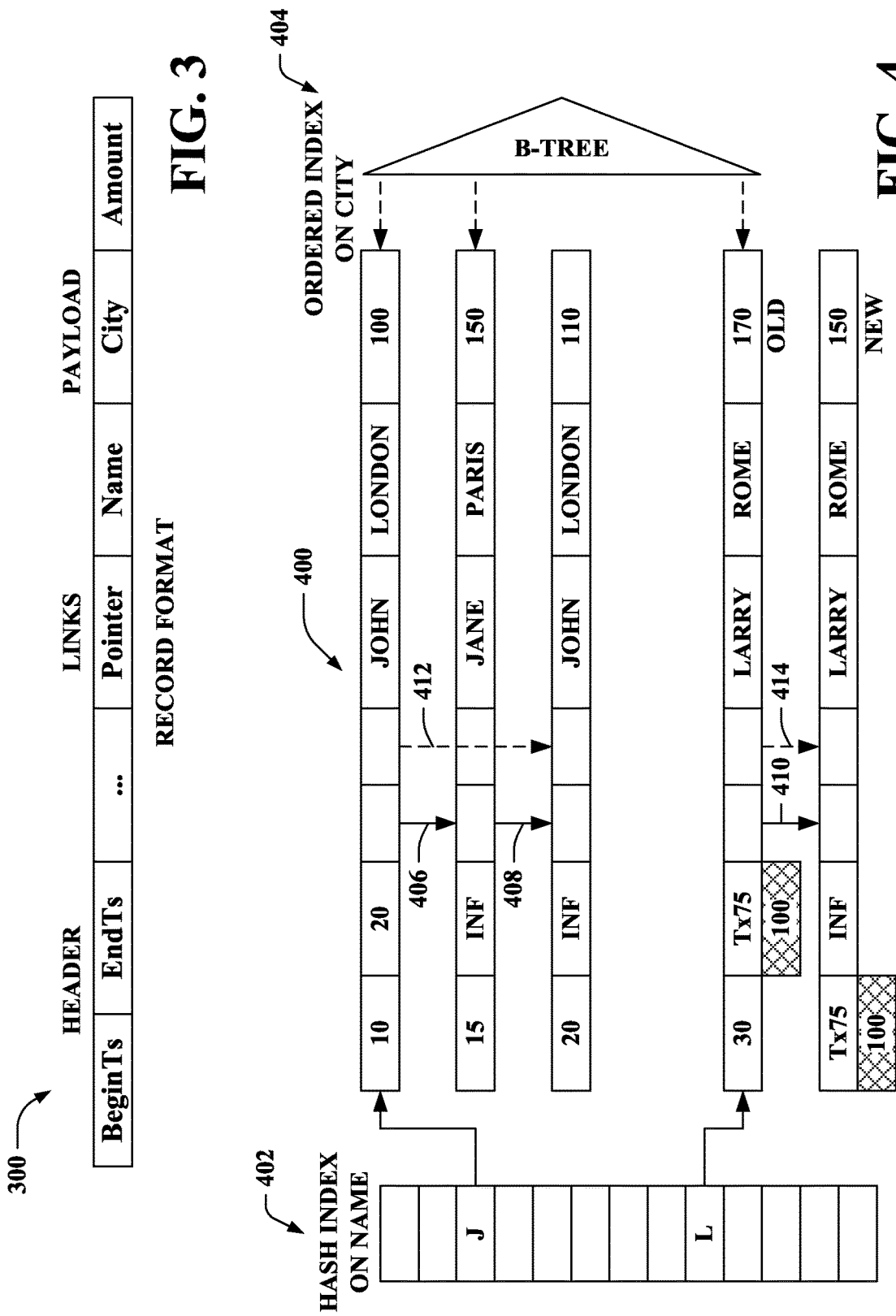

After TxN commits with end timestamp CtN

Primary Storage

900

| Ct | Inf | Key | Payload |
|---|---|---|---|
|  |  |  |  |

Notice Memo

| CtN | Inf | TableId | TxN | Key | N | 0 |
|---|---|---|---|---|---|---|

After TxM commits with end timestamp CtM

902

Primary Storage

| Ct | CtM | Key | Payload |
|---|---|---|---|

Secondary Storage

| TxN | Key | Payload |
|---|---|---|

Notice Memo

| CtM | Inf | TableId | TxN | Key | B | 0 |
|---|---|---|---|---|---|---|

FIG. 9

Before TxD commits

Secondary Storage (not changed) ⟵ 1000

| TxnN | Key | Payload |
|---|---|---|

Notice (may not exist)

| TxM/CtM | Inf | TableId | TxnN | Key | B | 0 |
|---|---|---|---|---|---|---|

After commit at time CtD ⟵ 1002

Old version of notice

| TxM/CtM | CtD | TableId | TxN | Key | B | 0 |
|---|---|---|---|---|---|---|

New version of notice

| CtD | Inf | TableId | TxN | Key | BE | CtM |
|---|---|---|---|---|---|---|

New notice (when previous version did not exist)

| CtD | Inf | TableId | TxN | Key | E | 0 |
|---|---|---|---|---|---|---|

FIG. 10

TRANSACTIONAL ACCESS TO RECORDS ON SECONDARY STORAGE IN AN IN-MEMORY DATABASE

BACKGROUND

Traditional database management systems were designed with data being disk resident (e.g., store data on secondary storage); accordingly, in these systems, data is paged in and out of memory as needed. More recently there has been a shift in design of database management systems, such as online transaction processing (OLTP) databases, attributable at least in part to decreases in memory costs. Accordingly, several database management systems (e.g., main memory database systems) have emerged that primarily rely on memory for data storage (e.g., most or all of the data may be stored in memory as opposed to secondary storage).

In a transactional workload, record access patterns tend to be skewed. For instance, some records are "hot" and accessed frequently (e.g., these records can be considered to be included in a working set), while others records are "cold" and accessed infrequently, if ever. Performance of database engines can depend on the hot records residing in memory. Further, cold records can be moved to secondary storage with less impact on overall system performance.

SUMMARY

Described herein are various technologies that pertain to accessing records of an in-memory database. A memory can include a primary storage and a data store can include a secondary storage. The primary storage includes a first subset of the records of the database, and the secondary storage includes a second subset of the records of the database. Moreover, the memory includes an update memo that includes timestamp notices. The timestamp notices specify statuses of records of the database having updates that span the primary storage and the secondary storage. The memory further includes a database management system that is executable by a processor. The database management system processes a transaction. Further, the database management system includes a storage interface component that accesses a record of the database for the transaction based on at least one of the timestamp notices of the update memo.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIGS. 3-4 illustrate an example of storing, accessing, and updating records without separating the records between the primary storage and the secondary storage.

FIG. 9 illustrates an exemplary effect of migrating a record from the primary storage to the secondary storage.

FIG. 10 illustrates an exemplary effect of deletion of a record from the secondary storage.

DETAILED DESCRIPTION

Figure 1:
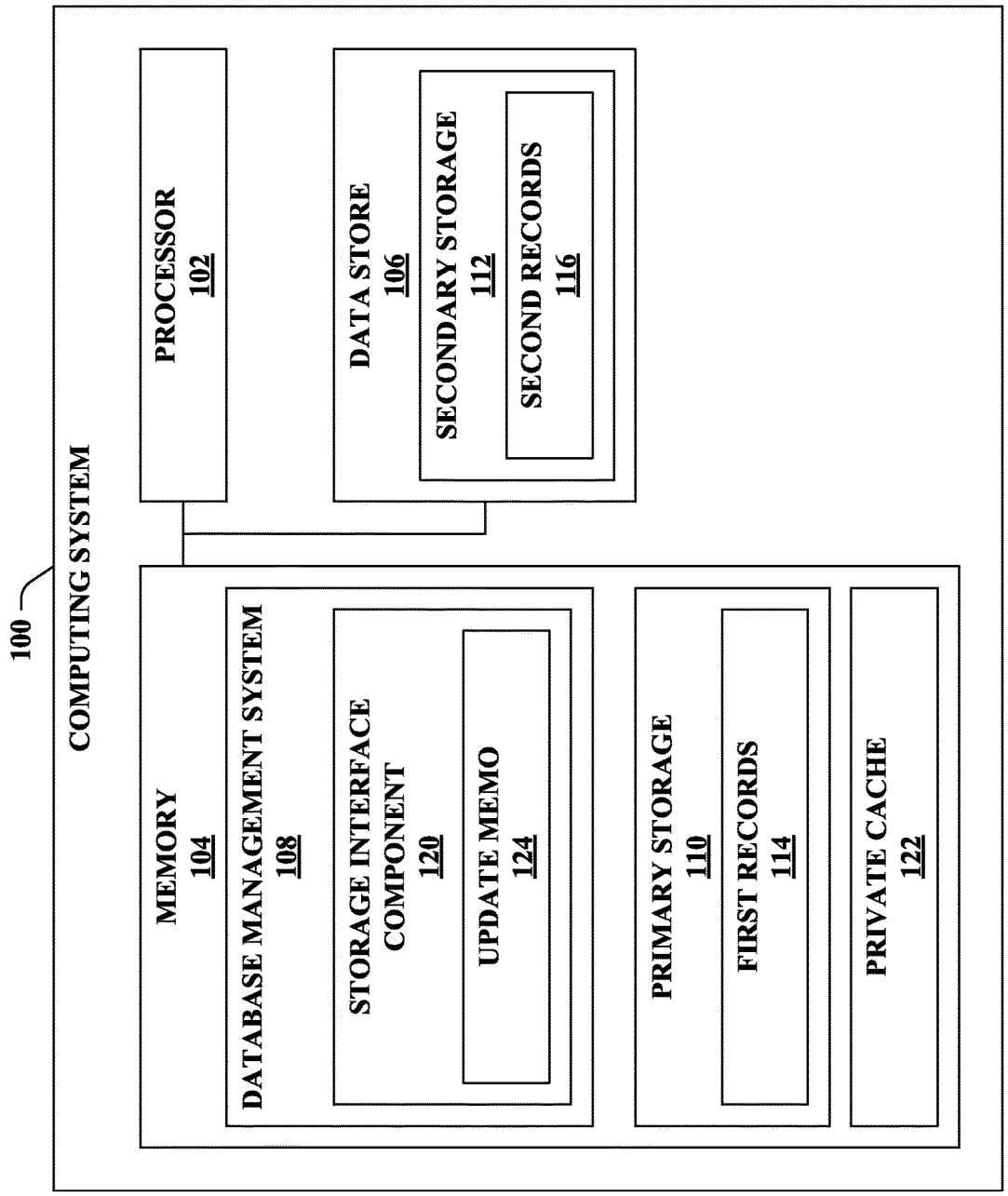
FIG. 1 illustrates a functional block diagram of an exemplary computing system that includes a database management system.

Various technologies pertaining to transactional access to records on secondary storage in an in-memory database are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates a computing system 100 that includes a database management system 108. The computing system 100 includes a processor 102 and a memory 104 (e.g., main memory). Moreover, the computing system 100 includes a data store 106 external to the memory 104. The data store 106, for example, can include disk drive(s), flash-based solid-state drive(s) (SSD), other types of storage devices, a combination thereof, and the like. The processor 102 is configured to execute instructions loaded into the memory 104 (e.g., one or more systems loaded into the memory 104 are executable by the processor 102, one or more components loaded into the memory 104 are executable by the processor 102, etc.). As described in greater detail herein, the memory 104 includes the database management system 108 that interacts with a database to capture and analyze data. Thus, the database management system 108 is executable by the processor 102. Moreover, the database can be an in-memory database.

According to various examples, the computing system 100 can be or include a computing device. Pursuant to various illustrations, the computing device can be a desktop computing device, a mobile computing device (e.g., a laptop computing device, a mobile telephone, a tablet computing device, a wearable computing device, a handheld computing device, a portable gaming device, a personal digital assistance, etc.), a gaming console, a set-top box, an in-vehicle communications and infotainment system, or the like. In accordance with other examples, the computing system 100 can be or include one or more server computing devices. For instance, the computing system 100 can be or include one or more datacenters, where a datacenter includes a plurality of server computing devices. Additionally or alternatively, the computing system 100 can be a distributed computing system.

The memory 104 further includes a primary storage 110, and the data store 106 (external to the memory 104) includes a secondary storage 112. As noted above, the database management system 108 interacts with a database, which includes records. The primary storage 110 and the secondary storage 112 are separate portions of the database. The primary storage 110 includes some records of the database (referred to herein as first records 114, a first subset of the records of the database), and the secondary storage 112 includes other records of the database (referred to herein as second records 116, a second subset of the records of the database). Collectively, the first records 114 and the second records 116 are referred to herein as records 114-116. The records 114-116, for example, can be rows of tables declared as in-memory tables (e.g., memory-optimized tables, etc.).

The database management system 108 (e.g., a database engine) creates, reads, updates, and deletes the records 114-116 of the database. The database management system 108 can be used with online transaction processing (OLTP) workloads. OLTP workloads oftentimes exhibit skewed access patterns where some records are frequently accessed, while other records are infrequently or never accessed. As referred to herein, a "hot" record is a record that is frequently accessed and a "cold" record is a record that is infrequently (or never) accessed.

The database includes at least one in-memory table managed by the database management system 108. The database management system 108 can support some tables of the database being declared as in-memory tables and other tables of the database not being in-memory tables. Records described herein (e.g., the records 114-116, versions of records, etc.) refer to records of tables declared as in-memory tables managed by the database management system 108. Accordingly, while not described herein, it is contemplated that the primary storage 110 and/or the secondary storage 112 can additionally include disparate records of the other tables of the database that are not in-memory tables.

For some conventional database management systems, an in-memory table is to reside entirely in memory. However, even a frequently accessed table may exhibit access skew, where a fraction of records of the table are hot while other records of the table are cold. Storing the cold records in memory can be more costly as compared to storing such records in a data store. Moreover, performance may be degraded if the cold records are stored in memory as compared to being stored in a data store.

In contrast, the database management system 108 includes a storage interface component 120 that supports automatically migrating the cold records to the secondary storage 112, while the hot records remain in the primary storage 110. The separation of the records 114-116 into the primary storage 110 and the secondary storage 112 is visible to the storage interface component 120, while upper layers of the database management system 108 (and applications that interact with the database management system 108) are unaware of such separation; thus, whether the primary storage 110 includes a given record or the secondary storage 112 includes the given record is transparent to the upper layers of the database management system 108 (and the applications). The upper layers of the database management system 108 (and the applications) can be unaffected by the split of the records 114-116 between the primary storage 110 and the secondary storage 112.

The storage interface component 120 automatically and transparently manages the first records 114 retained in the primary storage 110 and the second records 116 retained in the secondary storage 112. The storage interface component 120 can access the first records 114 and the second records 116. For instance, the storage interface component 120 can create, read, update, and delete the first records 114 and the second records 116. The storage interface component 120 can further migrate records between the primary storage 110 and the secondary storage 112 (e.g. the storage interface component 120 can migrate a record from the primary storage 110 to the secondary storage 112, the storage interface component 120 can migrate a record from the secondary storage 112 to the primary storage 110).

The primary storage 110 supports transactions. The secondary storage 112 may, but need not, support transactions. While the secondary storage 112 need not support transactions, the storage interface component 120 can access, update, and migrate the second records 116 in the secondary storage 112 (e.g., records can be migrated to and/or from the secondary storage 112) in a transactionally consistent manner. The secondary storage 112 provides methods for inserting, deleting, and retrieving the second records 116. Moreover, the secondary storage 112 provides durability (e.g., data is not lost upon occurrence of a crash). Optionally, the secondary storage 112 can include one or more indexes (e.g., the indexes can enhance speed of performing queries). According to various examples, the secondary storage 112 can be implemented as a database management system (DBMS) table, a key-value store, a file, or the like.

The first records 114 and the second records 116 are separated, with the memory 104 including the first records 114 and the data store 106 including the second records 116. According to an example, the memory 104 can include one or more access filters (e.g., a Bloom filter, a range filter, a combination thereof, etc.). The access filter(s) can include a summary of contents of at least a portion of the secondary storage 112. The storage interface component 120 can check the access filter(s) to identify whether to access the secondary storage 112. Other than the access filter(s), the memory 104 need not include information about the second records 116, such as keys in in-memory indexes. Further, the storage interface component 120 can enable a transaction (e.g., a unit of work) processed by the database management system 108 against the database to access and update the records 114-116 in the primary storage 110 and the secondary storage 112.

The database management system 108 can support a multi-version concurrency control (MVCC) scheme. As part of such scheme, records are multi-versioned and versions of a record have disjoint valid time ranges. Transactions read records as of a logical read time, while an update of a record creates a new version of the record (e.g., multi-versioning). By way of example, the storage interface component 120 can perform a read by checking the primary storage 110 in the memory 104 for a key; if the key is not found in the primary storage 110 or a lookup index is not unique, then the storage interface component 120 can determine whether to access the secondary storage 112 (e.g., using an access filter). Upon determining to access the secondary storage 112, the storage interface component 120 can perform a read of the secondary storage 112.

Moreover, the memory 104 includes a private cache 122. The private cache 122 can retain a record read by the storage interface component 120 from the secondary storage 112 for a transaction (e.g., a copy of the record as stored in the secondary storage 112). For example, the storage interface component 120 can read a record from the secondary storage 112 and store the record in the private cache 122. For simplicity, one private cache (the private cache 122) for a particular transaction is shown in FIG. 1; yet, it is contemplated that each transaction processed by the database management system 108 can have a respective private cache to store records read from the secondary storage 112. Other private caches can be substantially similar to the private cache 122.

Since the second records 116 in the secondary storage 112 may be accessed infrequently, the private cache 122 can be used to store a record (e.g., one of the second records 116) read from the secondary storage 112 for a given transaction due to a low probability of another transaction reading the same record within a time window (e.g., time window during which the private cache 122 retains the record). If a given record (e.g., one of the second records 116) from the secondary storage 112 is read twice by the storage interface component 120 for two different transactions, then two versions of the given record can be retained in private caches (e.g., one cached version for each of the transactions).

The storage interface component 120 maintains transactional consistency for updates that span the primary storage 110 and the secondary storage 112 (e.g., when data moves from primary storage 110 to secondary storage 112 or vice versa) even if the secondary storage 112 is not transactional. More particularly, the storage interface component 120 can include an update memo 124, which can be used to maintain transactional consistency (e.g., the memory 104 can include the update memo 124). The update memo 124 can be a table (e.g., a durable table) retained in the memory 104 that temporarily stores information concerning records having updates that span the primary storage 110 and the secondary storage 112.

The update memo 124 can temporarily store timestamp notices that specify statuses of at least a subset of the second records 116 in the secondary storage 112. By using the update memo 124, the secondary storage 112 need not be transactional. The storage interface component 120 can access a record of the database for a transaction based on at least one of the timestamp notices of the update memo 124. Moreover, the storage interface component 120 can use the update memo 124 to perform live migration of data to and from the secondary storage 112 while the database is online and active. Further, since the memory 104 includes the update memo 124, timestamp updates can be performed by the storage interface component 120 during post-processing of a transaction; the timestamp updates during transaction post-processing can be performed in the memory 104 without accessing the secondary storage 112. The storage interface component 120 can also perform validation in the memory 104 without accessing the secondary storage 112.

By performing transaction post-processing and validation in the memory 112 (without accessing the secondary storage 112), a number of accesses of the secondary storage 112 by the storage interface component 120 can be minimized. For example, the secondary storage 112 can be accessed by the storage interface component 120 to read, insert, or delete the second records 116; yet, the secondary storage 112 need not be accessed for transaction post-processing or validation.

Figure 2:
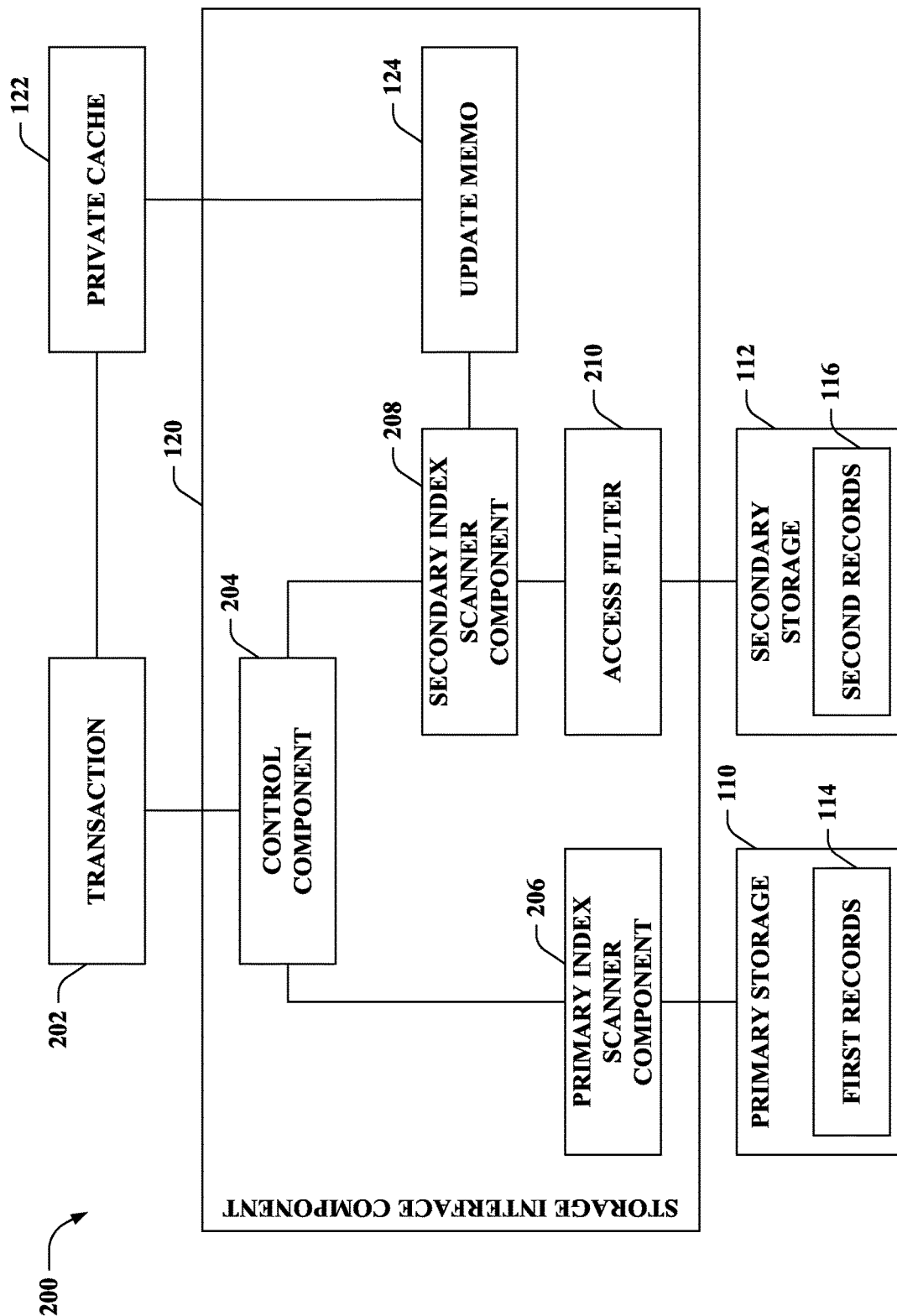
FIG. 2 illustrates a functional block diagram of an exemplary system that accesses and migrates records retained in a primary storage and a secondary storage.

Turning to FIG. 2, illustrated is a system 200 that accesses and migrates the records 114-116 retained in the primary storage 110 and the secondary storage 112. The system 200 includes the storage interface component 120, the primary storage 110, and the secondary storage 112. As noted above, the primary storage 110 stores the first records 114 and the secondary storage 112 stores the second records 116. The primary storage 110 retains records (e.g., the first records 114) that are accessed frequently, while the secondary storage 112 retains less frequently accessed records (e.g., the second records 116). For instance, the secondary storage 112 can retain archival data that is rarely accessed but part of the database with which the database management system 108 interacts.

The storage interface component 120 provides a unified interface for accessing the records 114-116 of the database, which are distributed between the primary storage 110 and the secondary storage 112. The storage interface component 120 provides an interface to upper layers of the database management system 108 (e.g., layers above the storage interface component 120) and applications that interact with the database management system 108, while obscuring a physical location of a record from the upper layers of the database management system 108 as well as the applications that interact with the database management system 108. Thus, the storage interface component 120 can obscure a split of the records 114-116 of the database between the primary storage 110 and the secondary storage 112. Moreover, utilization of the storage interface component 120 can enable decreasing an amount of overhead caused by accessing the secondary storage 112.

The storage interface component 120 can automatically and transparently move records between the primary storage 110 and the secondary storage 112 based on access patterns for the records. The storage interface component 120 can migrate the records between the primary storage 110 and the secondary storage 112 while the database management system 108 is online and operating (e.g., migration can be performed without affecting active transactions). To migrate records between the primary storage 110 and the secondary storage 112, the storage interface component 120 can perform a migration using operations (insert and delete) wrapped in a transaction. This allows the migration transaction to run concurrently with other transaction(s), with the migration transaction and the other transaction(s) being isolated and consistency of the database being maintained.

The storage interface component 120 can enable a transaction 202, which can be performed in the database management system 108 against the database, to access and update the records 114-116 in the primary storage 110 and the secondary storage 112. The transaction 202 can include a set of operations and/or queries that can be processed by the database management system 108. The split of the records 114-116 between the primary storage 110 and the secondary storage 112 is transparent to the transaction 202. Moreover, the private cache 122 corresponds to the transaction 202; the private cache 122 stores one or more records (e.g., from the second records 116) read as part of the transaction 202 by the storage interface component 120 from the secondary storage 112. A memory heap (e.g., the private cache 122), separate from memory heaps of other transactions, is reserved for the transaction 202. Cached records for the transaction 202 can be stored in the memory heap. Further, when the transaction 202 terminates, memory reserved by the heap is released.

The storage interface component 120 includes a control component 204 that manages performance of an operation upon a record (or more than one of the records 114-116), where the transaction 202 specifies the operation. One or more operations can be wrapped in the transaction 202. Moreover, the control component 204 can enable traversal over the records 114-116 in the primary storage 110 and the secondary storage 112 in connection with performance of the operation (or operations).

The storage interface component 120 further includes a primary index scanner component 206 that scans an index (or indexes) of the primary storage 110. The primary storage 110 includes one or more indexes. The primary index scanner component 206 can perform a lookup based on the index(es) of the primary storage 110 to enable the control component 204 to access, insert, and delete records in the primary storage 110.

The primary storage 110 supports various types of indexes that can be scanned by the primary index scanner component. Examples of types of indexes include hash indexes, ordered indexes, and so forth; yet, it is contemplated that other types of indexes can additionally or alternatively be supported by the primary storage 110. By way of illustration, hash indexes can be implemented using lock-free hash tables. Pursuant to another illustration, ordered indexes can be implemented using tree data structures, such as a B-trees, Bw-trees (e.g., lock-free versions of B-trees), and so forth.

Moreover, the storage interface component 120 includes a secondary index scanner component 208 that enables the control component 204 to access, insert, and delete records in the secondary storage 112. As noted above, the secondary storage 112 may optionally include one or more indexes. If the secondary storage 112 includes such index(es), the secondary index scanner component 208 can scan the index(es) of the secondary storage 112. According to an example, the secondary storage 112 may include the same types of index(es) as the primary storage 110. Following this example, the secondary index scanner component 208 can likewise perform a lookup based on the index(es) of the secondary storage 112. Yet, it is to be appreciated that the claimed subject matter is not limited to the foregoing example (e.g., the secondary storage 112 may lack an index while providing other methods for the secondary index scanner component 208 to employ for inserting, accessing, and deleting records).

The storage interface component 120 may optionally include an access filter 210. While FIG. 2 shows one access filter (e.g., the access filter 210), it is contemplated that the storage interface component 120 can include more than one access filter. The access filter 210 can be a table retained in the memory 104. The access filter 210 stores a compact summary of contents of the secondary storage 112 (or a portion of the contents of the secondary storage 112). Pursuant to an example, indexes of the secondary storage 112 can be associated with corresponding access filters; yet, as noted above, according to other examples, the secondary storage 112 may lack indexes.

Prior to accessing the secondary storage 112, the control component 204 checks the access filter 210 (or a plurality of access filters) to identify whether to access the secondary storage 112. If the access filter 210 indicates that no records in the secondary storage 112 satisfy search criteria, then the control component 204 can skip accessing the secondary storage 112, thereby avoiding an unnecessary access of the secondary storage 112.

Examples of types of the access filter 210 include a Bloom filter, a range filter, and so forth. A Bloom filter, for instance, can be used by the control component 204 for point lookups and a range filter can be used by the control component 204 for range queries. By way of illustration, the storage interface component 120 can include a plurality of differing types of access filters. Additionally or alternatively, the storage interface component 120 can include a plurality of a particular type of access filter.

According to an example, the storage interface component 120 can include a Bloom filter for a hash index of the secondary storage 112 (e.g., one Bloom filter per hash index). By way of another example, the storage interface component 120 can include a set of Bloom filters for a hash index of the secondary storage 112; the Bloom filters in the set can each cover records in adjacent hash buckets. Following this example, each Bloom filter in the set can be smaller than a Bloom filter for the hash index. Use of the plurality of smaller Bloom filters as opposed to a single larger Bloom filter for the hash index can result in the following: (a) the smaller Bloom filters can be built faster; (b) filter lookups performed by the control component 204 can be faster (e.g., fewer cache misses); (c) access skew can be exploited by assigning fewer bits to infrequently used Bloom filters as compared to more frequently accessed Bloom filters; and (d) Bloom filters that have deteriorated because of inserts and deletes can be rebuilt by scanning the hash buckets.

When the control component 204 receives a record from the secondary index scanner component 208 (e.g., one or more of the second records 116 from the secondary storage 112), the control component 204 can check whether the record is visible. Moreover, the control component 204 can evaluate whether the record satisfies a filter predicate (if any). Upon determining that the record qualifies, the control component 204 copies the record to the private cache 122. A copy of a record stored in the private cache 122 is referred to herein as a cached record. The control component 204 can set a first link field of the cached record to a value "COLD" and clear other link fields of the cached record. The control component 204 further sets a notice pointer (NoticePtr) field in a prefix of the cached record to include a pointer to a timestamp notice in the update memo 124 if a timestamp notice related to the cached record exists in the update memo 124. Further, the control component 204 returns a pointer to a portion of the cached record without the prefix (a pointer to a real record part of the cached record as described below).

Whether the primary storage 110 or the private cache 122 retains a record can be transparent to upper layers of the database management system 108 that interface with the storage interface component 120 (and applications that interact with the database management system 108). However, it is contemplated that the control component 204 can set a first link field of a cached record in the private cache 122 to "COLD" to enable identifying which records originated from the secondary storage 112 during validation.

As noted above, the update memo 124 can be a table (e.g., a durable table) retained in the memory 104 that temporarily stores timestamp notices that specify statuses of at least a subset of the second records 116 in the secondary storage 112. The storage interface component 120, for example, can include one update memo (e.g., the update memo 124) per database. The update memo 124 enables validation and detection of write-write conflicts to be performed in memory without accessing the secondary storage 112.

The update memo 124 is used by the control component 204 when reading a record from the secondary storage 112 and during validation. When reading a record, the control component 204 checks whether the update memo 124 includes a matching timestamp notice for the record. If the update memo 124 includes a matching timestamp notice for the record, then the timestamp notice specifies a current status and timestamps for the record.

According to an example, an update transaction (e.g., the transaction 202), running under repeatable read or serializable isolation, validates its reads by rechecking the timestamps of records that are read. The update memo 124 stores the current timestamps of records updated since a begin time of an oldest active transaction. Thus, the update transaction can validate reads by checking timestamp notices in the update memo 124.

FIGS. 3-4 illustrate an example of storing, accessing, and updating records without separating the records between the primary storage 110 and the secondary storage 112. Rather, in the example described in FIGS. 3-4, the primary storage 110 retains the records. It is to be appreciated that the example of FIGS. 3-4 is provided for illustration purposes, and the claimed subject matter is not so limited.

FIG. 3 depicts an exemplary structure 300 of a record that can be stored in the primary storage 110. The structure 300 includes a header, a number of link (pointer) fields, and a payload. The header includes a begin timestamp field (BeginTs) and an end timestamp field (EndTs). The database management system 108 uses multi-versioning, where an update to a record creates a new version of the record; thus, a valid time period of a version of a record is set by a begin timestamp and an end timestamp respectively stored in the begin timestamp field and the end timestamp field of the header.

Moreover, a number, type, etc. of fields in the payload can be defined (e.g., user defined, etc.). In the example illustrated in FIGS. 3-4, the payload includes three fields (for the exemplary bank account table illustration): Name, City, and Amount. Again, it is to be appreciated that the claimed subject matter is not limit to this example, which is provide for illustration purposes.

FIG. 4 shows an exemplary table 400 that includes five version records. While not shown, it is contemplated that the table 400 can include substantially any number of additional version records.

As shown in FIG. 4, the exemplary table 400 has two indexes; a hash index 402 on the Name field and an ordered index 404 on the City field. Each index can use a respective link field in the records. As depicted, a first link field is reserved for the hash index 402 and the second link field is reserved for the ordered index 404.

For illustration purposes, a hash function used for the hash index 402 can select a first letter of a name in the Name field. Version records that hash to the same bucket are linked together using the first link field (represented by arrows 406-410). Moreover, leaf nodes of a tree data structure (e.g., a B-tree, a Bw-tree, etc.) can store pointers to records. If multiple records have the same key value, duplicates are linked together using the second link field (represented by arrows 412-414) in the records and the tree data structure can point to a record on the chain (e.g., first record on the chain, etc.).

Hash bucket J includes three records: two versions of a record for John and one version of a record for Jane. Jane's single version record (Jane, Paris, 150) has a valid time period from time 15 to infinity, meaning that such version record was created by a transaction that committed at time 15 and is still valid. John's older version record (John, London, 100) was valid from time 10 to time 20; at time 20, John's older version record was updated. The update created a new version record (John, London, 110), which has a valid time period from time 20 to infinity.

Various operations can be performed on the version records of the exemplary table 400. The operations can include reading a record, updating a record, deleting a record, and inserting a record.

A read operation specifies a logical (as-of) read time and only versions whose valid time periods overlap the read time are visible to the read; other versions are ignored. Different versions of a record have non-overlapping valid time periods, so at most one version of a record is visible to a read at a given time. A lookup for John with read time 15, for example, can trigger a scan of bucket J that checks records in the bucket. The scan returns the record with Name equal to John and valid time period 10 to 20. If the index on Name is declared to be unique, the scan of the buckets can stop upon finding a qualifying record.

According to another example, an update operation can be performed. Bucket L includes two versions of a record that belong to Larry. Transaction 75 is in the process of deducting $20 from Larry's account. As part of the update, a new record (Larry, Rome, 150) is created and inserted into the index.

Note that a transaction Id (Tx75) of transaction 75 is stored in the BeginTs and EndTs fields of the new and old version, respectively (e.g., a bit in the BeginTs field can indicate content type of the BeginTs field, a bit in the EndTs field can indicate content type of the EndTs field). A transaction Id stored in the EndTs field can inhibit other transactions from updating the same version of the record. When read, a transaction Id stored in the BeginTs field indicates that the version may not yet be committed and identifies the transaction that created the version.

Now suppose transaction 75 commits with end timestamp 100. After committing, transaction 75 returns to the old and new versions and sets the BeginTs and EndTs fields to 100. The final values are shown in FIG. 4 by the shading below the old and new versions. The old version (Larry, Rome, 170) now has the valid time period 30 to 100 and the new version (Larry, Rome, 150) has a valid time period from 100 to infinity.

The foregoing example of an update operation also illustrates delete and insert operations for records in the primary storage 110. An update operation can include deleting an existing version and inserting a new version. Moreover, obsolete versions can be discarded; for instance, a version of a record can be discarded when no longer visible to any active transaction. Cleaning out obsolete versions (e.g., garbage collection), for instance, can be handled cooperatively by worker threads.

Again, reference is made to FIG. 1. The database management system 108 can utilize optimistic MVCC to provide snapshot, repeatable read, and serializable transaction isolation without locking Below are various features of optimistic MVCC that can be implemented in the database management system 108.

The database management system 108 can use timestamps produced by a monotonically increasing counter. Below are various uses of the timestamps by the database management system 108.

The timestamps can be used as a commit time (e.g., end time) of a transaction. An update transaction commits at a distinct point in time called the commit or end timestamp of the transaction. The commit time determines a position of the transaction in a transaction serialization order.

Moreover, the timestamps can be utilized to specify a valid time period for a version of a record. For instance, each record in the database can include two timestamps, namely, a begin timestamp and an end timestamp. The valid time period for a version of a record is a timestamp range set by the begin timestamp and end timestamp.

The timestamps can further be used for a logical read time. More particularly, a read time of a transaction is set to a start time of the transaction. For instance, only versions of records with valid time periods that overlap the logical read time of a transaction are visible to the transaction.

Version visibility supports concurrency control in the database management system 108. For example, a particular transaction can execute with logical read time. Following this example, versions of records with both begin timestamps less than the logical read time and end timestamps greater than the logical read time are visible to the particular transaction; other versions of records (other than updates for the particular transaction which are visible to the particular transaction) are not visible to the particular transaction. Operation(s) of a transaction can be performed on versions of records that are visible to the transaction, while the operation(s) are unable to be performed on versions of records that are not visible to the transaction.

The following generally describes transaction commit processing. Upon completion of normal processing of a transaction by the database management system 108, the database management system 108 can being commit processing of the transaction. Commit processing, for example, can include validation, logging, and post-processing.

Validation is performed for update transactions running at repeatable read or serializable isolation; validation need not be performed for read-only transactions or update transactions at lower isolation levels. Validation begins by obtaining an end timestamp of a transaction. Then, reads performed as part of the transaction are verified and, if executed under serializable isolation, the storage interface component 120 verifies that no phantoms have appeared.

To validate reads for the transaction, the storage interface component 120 checks that the versions that have been read are visible as of the end time of the transaction (e.g., specified by the end timestamp). To check for phantoms, index scans are repeated to look for versions that have become visible since the transaction began (e.g., specified by the begin timestamp). To enable validation, the storage interface component 120 can maintain a read set and a scan set for each transaction. A read set for a transaction includes pointers to versions of records read as part of the transaction. A scan set includes information used to repeat scans.

Moreover, logging and post-processing can be performed by the storage interface component 120. For instance, a transaction T can be committed upon updates to the database being written to a transaction log. Transaction T writes to the log the contents of new versions created by T and the primary key of versions deleted by T.

Upon the updates of transaction T being logged, T is committed (e.g., irreversibly). Thereafter, the storage interface component 120 can begin a post-processing phase for transaction T during which the begin and end timestamps in versions affected by the transaction are updated to include the end timestamp of the transaction T. For instance, a write set can be maintained for a transaction; the write set can include pointers to inserted and deleted versions of records, which can be used to perform the timestamp updates and generate the log content.

Figure 5:
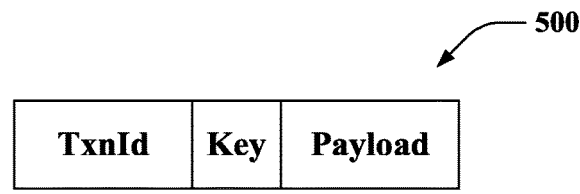
FIG. 5 illustrates an exemplary structure of a record in the secondary storage.

Turning to FIG. 5, illustrated is an exemplary structure 500 of a record (e.g., one of the second records 116) in the secondary storage 112. The structure 500 includes a transaction Id (TxnId) field, a key field, and a payload. The key field and the payload correspond to counterparts in a structure of a record in the primary storage 110. Further, the TxnId field of a record stores an Id of a transaction (e.g., a migration transaction) that inserted such record into the secondary storage 112. TxnId can serve as a version number used to identify different versions of a common record.

Figure 6:
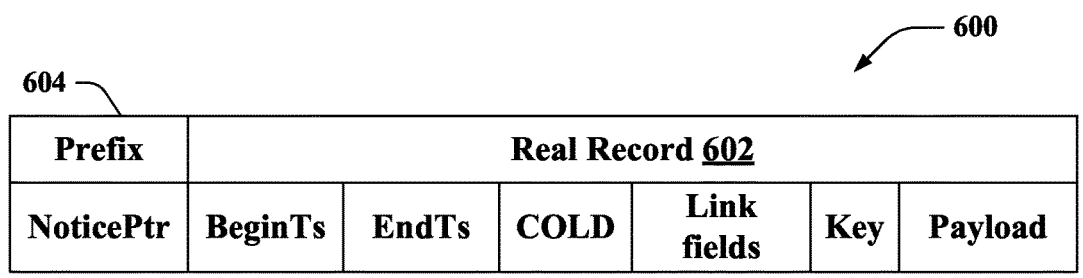
FIG. 6 illustrates an exemplary structure of a cached record in a private cache.

Now referring to FIG. 6, illustrated is an exemplary structure 600 of a cached record in the private cache 122. The structure includes a real record portion 602, which can include a structure that matches a structure of a record in the primary storage 110. For instance, the real record portion 602 can include a BeginTs field, an EndTs field, link fields (e.g., with a first link field including a value set to COLD), a key field, and a payload. Moreover, a prefix 604 of the structure 600 includes a notice pointer (NoticePtr) field. The NoticePtr field can include a pointer to a timestamp notice in the update memo 124 or null. Such pointer can be used during validation.

Figure 7:
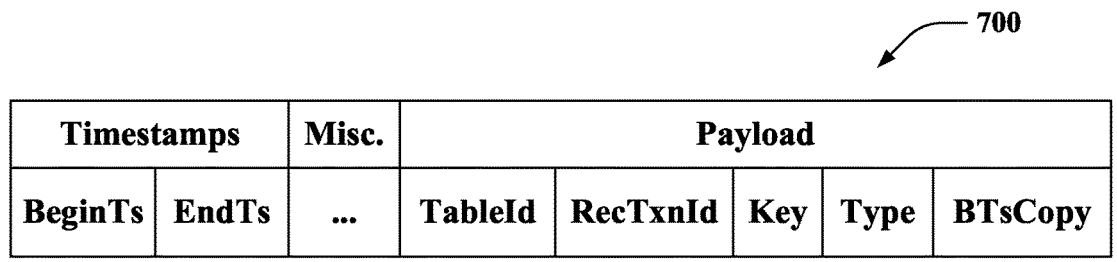
FIG. 7 illustrates an exemplary structure of a timestamp notice in an update memo.

Turning to FIG. 7, illustrated is an exemplary structure 700 of a timestamp notice in the update memo 124. Similar to the other structures described herein, the structure 700 includes a BeginTs field and an EndTs field. According to the depicted example, a header of the structure 700 can also include other miscellaneous fields; yet, the claimed subject matter is not so limited.

A payload of the structure 700 can include various fields. More particularly, the payload can include fields to identify a target record of a notice: TableId, RecTxnId, and Key. The TableId field can include an Id of a table to which the target record belongs. The RecTxnId field can include a value from the TxnId field of the target record. The Key field can be a variable length field storing a key of the target record. The secondary storage 112 can include multiple versions of a common record, but the versions have different TxnId values. Moreover, a BTsCopy field can be used for storing a copy of a timestamp.

A timestamp notice includes timestamps for a target record; the timestamp notice is used when the record is read into a private cache (e.g., the private cache 122). The structure 700 can further include a Type field. The Type field can include a value that specifies a type of timestamps carried by a notice. Examples of the types are set forth below:

N (None)—temporary notice with no timestamps. The target record was orphaned because of a failed migration transaction and is to be ignored.

B (Begin)—the begin timestamp of the timestamp notice equals the begin timestamp of the target record.

E (End)—the begin timestamp of the timestamp notice equals the end timestamp of the target record.

BE (Begin & End)—the BTsCopy field includes the begin timestamp of the target record and the begin timestamp of the timestamp notice equals the end timestamp of the target record.

Figure 8:
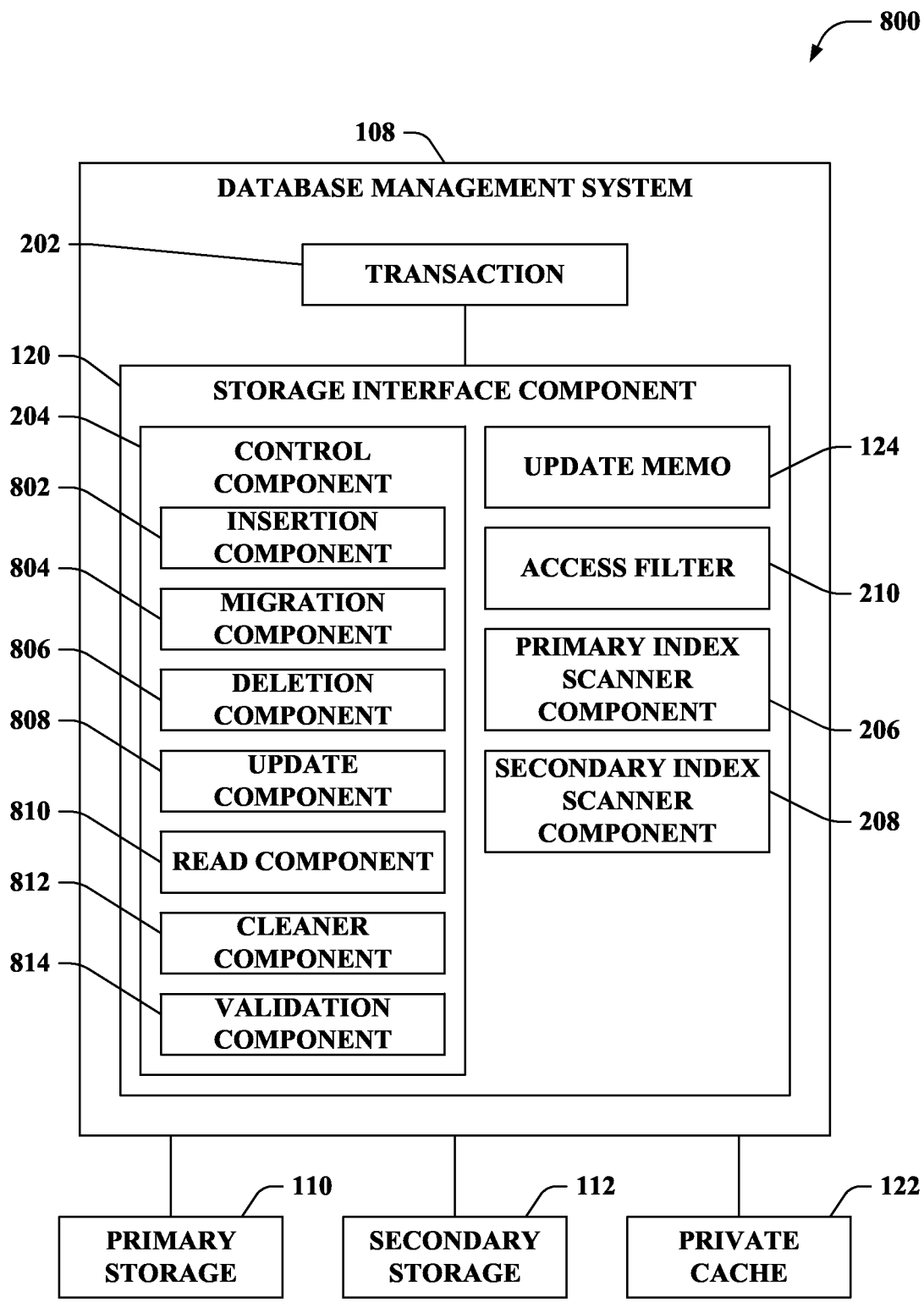
FIG. 8 illustrates a functional block diagram of an exemplary system that performs various operations in connection with use of the secondary storage.

Turning to FIG. 8, illustrated is a system 800 that performs various operations in connection with use of the secondary storage 112. The system 800 includes the database management system 108, the primary storage 110, the secondary storage 112, and the private cache 122. The database management system can process the transaction 202. The transaction 202 can include a set of operations and/or queries that can be conducted by the database management system 108.

As described above, the database management system 108 includes the storage interface component 120. The storage interface component 120 includes the control component 204, the primary index scanner component 206, the secondary index scanner component 208, the update memo 124, and the access filter 210. Moreover, the control component 204 can include an insertion component 802 that inserts new records into the primary storage 110. Further, a new version of a record resulting from an update to the record can be inserted into the primary storage 110 (by an update component 808 as described below); the foregoing can occur regardless of where the old version resides.

The control component 204 also includes a migration component 804. According to an example, the migration component 804 can classify candidate records for migration to and from the secondary storage 112. The migration component 804 can log record accesses (e.g., a sample of record accesses) to enable estimating access frequencies. Pursuant to another example, estimation of access frequencies can be performed by a disparate component of the database management system 108 (or separate from the database management system 108, the estimation can be performed offline, etc.); the migration component 804 can receive information triggering migration of one or more records from such disparate component.

The migration component 804 can trigger migration to and from secondary storage 112 using the results of classification. The migration component 804 can migrate a record while the database is online and active. Migrating data from the primary storage 110 to the secondary storage 112 is now described (an update operation can be used to migrate data from the secondary storage 112 to the primary storage 110 as described later). Inserts into the secondary storage 112 are performed by a set of two migration transactions that move records from the primary storage 110 to the secondary storage 112. According to an example, the migration component 804 can cause migration to be executed in the background when the database management system 108 is lightly loaded. Migration of a single record is discussed below, but such techniques can similarly apply when multiple records are concurrently migrated.

The migration component 804 migrates a record from the primary storage 110 to the secondary storage 112 by deleting the record from the primary storage 110 and re-inserting a corresponding record (e.g., with a common key and payload) in the secondary storage 112. During processing of the first migration transaction, the migration component 804 can read a record from the primary storage 110 and install a timestamp notice in the update memo 124. The timestamp notice can include an indicator to ignore a corresponding record in the secondary storage 112, where the corresponding record pertains to the record. Moreover, during processing of the second migration transaction, the migration component 804 can insert the corresponding record in the secondary storage 112, update the timestamp notice in the update memo 124 to remove the indicator to ignore the corresponding record in the secondary storage 112, and delete the record in the primary storage 110. During migration, the database management system 108 is still active and other transactions may be running, some of which may attempt to read or update the record being migrated.

The following exemplary algorithm (Algorithm 1) describes migration of a record from the primary storage 110 to the secondary storage 112. At least a portion of Algorithm 1 can be performed by the migration component 804. It is to be appreciated that the algorithm is provided for illustration purposes, and the claimed subject matter is not limited to the example set forth in this algorithm.

---

Algorithm 1: MigrateRecordToSecondaryStorage

1. Begin transaction. Denote transaction Id by TnN.
2. Read the target record from the primary storage into a buffer TrgRec.
3. If no record was found, abort the transaction and report "no record found.
4. Check whether a begin timestamp of the record is less than the read time of the oldest active transaction and an end timestamp equals infinity. If not, abort the transaction and report "record can't be migrated."
5. Create a timestamp notice Ntc, setting fields of Ntc as follows: TableId = Id of target table, RecTxnId = TxN, Key = TrgRec.Key, Type = N, BTsCopy = 0.
6. Insert Ntc into the update memo.
7. Commit transaction.
8. Begin transaction. Denote transaction Id by TxM.
9. Set TrgRec.TxnId = TxN.
10. Insert TrgRec into secondary storage.
11. Update affected Bloom filters.
12. Update notice Ntc in the update memo, setting Type = B.
13. Delete TrgRec from the primary storage.
14. Commit transaction.

---

Because the secondary storage 112 need not be transactional, the migration component 804 can perform the migration from the primary storage 110 to the secondary storage 112 in two steps, each in a separate transaction. The first migration transaction is referred to as TxN, and the second migration transaction is referred to as TxM. In contrast, if such migration were performed in a single transaction and the transaction aborted, it is possible that two valid instances of the same record may result, one in the primary storage 110 and one in the secondary storage 112.

During processing of the first transaction (TxN, steps 1-6 of Algorithm 1), the migration component 804 reads a target record and installs a preliminary migration timestamp notice Ntc of type N in the update memo 124. The timestamp notice provides an indication to ignore the target record as part of processing of other transactions (e.g., transactions other than the first transaction TxN). A record is not migrated unless it is a latest version (e.g., end timestamp of infinity) and visible to current and future transactions (checked in step 4). Versioning in the database management system 108 can be transient, where an old version is kept only until no longer visible to any currently active transactions. Moreover, old versions can be cleaned, so such versions need not be migrated to the secondary storage 112. The first transaction TxN commits in step 7 of Algorithm 1.

During processing of the second transaction (TxM, steps 8-13 of Algorithm 1), the migration component 804 performs the migration. The migration component 804 creates a copy of the target record, inserts the copy of the target record into the secondary storage 112, and updates affected Bloom filter(s). Once the record has been inserted into the secondary storage 112, the migration component 804 updates the migration timestamp notice in the update memo 124, setting its type to B. Thereafter, the migration component 804 deletes the record in the primary storage 110 and the transaction commits. The begin timestamp stored in the migration timestamp notice matches an end timestamp of the version in the primary storage 110. The migration timestamp notice in the update memo 124 is updated in the same transaction as deletion of the version in the primary storage 110, which provides that the two versions have non-overlapping timestamp ranges (e.g., one of the two versions may be visible to a transaction, but not both). The second transaction TxM commits in step 14 of Algorithm 1.

If transaction TxM fails to commit because of a crash or the like, changes (other than possibly the insert into the secondary storage 112) are automatically rolled back by the database management system 108. If the insert into the secondary storage 112 is not rolled back, then the new version can continue to exist in the secondary storage 112; however, such version is associated with a timestamp notice of type N, which indicates to ignore the version of the record.

FIG. 9 illustrates an exemplary effect of migrating a record from the primary storage 110 to the secondary storage 112. At 900, a status after commit of the first transaction, TxN, is depicted (e.g., before commit of the second transaction). A commit time (e.g., an end timestamp) of the first transaction is CtN. At 902, a status after commit of the second transaction, TxM, is depicted. A commit time (e.g., an end timestamp) of the second transaction is CtM. As depicted at 900, a timestamp notice is inserted into the update memo 124 responsive to commit of the first transaction TxN. As depicted at 902, the version in the primary storage 110 is deleted responsive to commit of the second transaction TxM; the version in the primary storage 110 is deleted by setting the end timestamp CtM in the EndTs field. Moreover, responsive to commit of the second transaction TxM, a copy of the record is inserted into the secondary storage 112 and the timestamp notice is updated to a type B and to have the end timestamp CtM in the BeginTs field.

Again, reference is made to FIG. 8. The old version in the primary storage 110 and the old version of the timestamp notice of type N can be garbage collected upon no longer being visible to an active transaction (e.g., by a cleaner component 812 described herein). The new version of the timestamp notice can be deleted (e.g., by the cleaner component 812) as soon as the version in the secondary storage 112 is visible to active transactions (e.g., when the read time of the oldest active transaction in the system becomes higher than CtM in the example of FIG. 9).

According to an example, it is possible that a transaction T may attempt to read or update a record R in the primary storage 110, where R is under active migration by the migration component 804. In this case, R has an end timestamp of TxM, meaning that R is in the process of being moved to the secondary storage 112 and a type of a timestamp notice for R is being changed responsive to processing of transaction TxM (steps 7-13 in Algorithm 1). In this case, T follows version visibility supported by the database management system 108. If R is read responsive to processing of T, R is ignored if TxM is active or aborted. If preparing to commit TxM, then R is visible to T if a commit time of TxM is greater than a read time of T; otherwise, T speculatively ignores R (e.g., T takes a commit dependency on TxM). If TxM is committed, then T uses an end timestamp of TxM to test visibility. T is allowed to update R only if TxM has aborted; if TxM is active or preparing, then this is write-write conflict and T aborts.

Moreover, the control component 204 can include a deletion component 806 that can delete a record from the secondary storage 112. Deleting a record from the secondary storage 112 can be a two-step process. The deletion component 806 can first mark the record logically deleted by creating a timestamp notice of type E or BE in the update memo 124. The timestamp notice specifies the end timestamp of the record. The update memo 124 is checked when reading the corresponding record so the timestamp notice can be found and checked to identify the visibility of the record. If the record is not visible, the record can be ignored when read. The record can be physically removed later by the cleaner component 812. The record can be removed and the timestamp notice deleted when no longer visible to any active transaction.

The deletion component 806 can read a record for deletion from the secondary storage 112. Moreover, the deletion component 806 can search the update memo 124 for a matching timestamp notice for the record. The deletion component 806 can also mark the record logically deleted in the update memo 124 responsive to searching for the matching timestamp notice by updating the matching timestamp notice in the update memo 124 (if found) or inserting a new timestamp notice in the update memo 124 for the record (if not found).

The following exemplary algorithm (Algorithm 2) describes deletion of a record from the secondary storage 112. Algorithm 2 can be performed, for instance, at least in part by the deletion component 806. It is to be appreciated that the algorithm is provided for illustration purposes, and the claimed subject matter is not limited to the example set forth in this algorithm.

---

Algorithm 2: DeleteRecordFromSecondaryStorage

1. Begin transaction. Denote transaction Id by TxD.
2. Read the target record from the secondary storage into a buffer TrgRec.
3. If no record was found, abort the transaction and report "no record found."
4. Look for a matching (and visible) timestamp notice in the update memo.

| Algorithm 2: DeleteRecordFromSecondaryStorage |
| --- |
| 5. If no timestamp notice is found, insert a timestamp notice into the update memo with TableId = Id of target table, RecTxnId = TrgRec.TxnId, Key = TrgtRec.Key, Type = E, BTsCopy = 0.
6. If a timestamp notice of Type N if found, abort the transaction and report "no record found."
7. If a timestamp notice of Type B is found, update the timestamp notice by changing its Type field to BE and setting the BTsCopy field as follows.
   7.1. If a begin timestamp field of the timestamp notice includes a transaction ID TxM, look up the transaction object for TxM and copy its commit timestamp into BTsCopy. It has a commit timestamp because the timestamp notice is visible.
   7.2. If the begin timestamp field of the timestamp notice includes a timestamp, copy it into BTsCopy.
8. If a notice of type BE or E is found, the record has already been deleted so abort the transaction and report "no record found."
9. If the record is deleted because it is being updated, the new version can be inserted into the primary storage at this point.
10. Commit transaction. |

According to an example, a record in the secondary storage 112 may be deleted because it is being updated. In such a scenario, the new version is inserted into the primary storage 110 in the same transaction.

FIG. 10 illustrates an exemplary effect of deletion of a record from the secondary storage 112. At 1000, depicted is the record in the secondary storage 112 and a timestamp notice (which may or may not exist) before TxD commits. The record in the secondary storage 112 remains unchanged after TxD commits at time CtD. At 1002, various examples of the timestamp notice after TxD commits at time CtD are depicted. As illustrated, timestamp notice(s) are added and/or updated in the update memo 124 as a result of the deletion (e.g., depending upon whether a timestamp notice of Type B for the record was in the update memo prior to commit of TxD). The begin timestamp of a new version of a notice or a new notice after commit at time CtD specifies the end timestamp the transaction TxD.

Reference is again made to FIG. 8. Write-write conflicts can be detected in connection with deletion. Suppose two transactions attempt to concurrently delete or update the same record. A write-write conflict in the primary storage 110 is detected because each record has one copy in memory. One of the transactions updates an end timestamp of the record first; when the second transaction attempts to change the end timestamp of the record, it is detected that the end timestamp of the record is no longer equal to infinity. Thus, the second transaction can identify that another transaction has or is about to delete the version, and can abort.

With cold records in the secondary storage 112, each transaction reads a copy from disk and obtains a cached version in a buffer corresponding to the transaction. An update or deletion is performed by inserting or updating a timestamp notice in the update memo 124. If there is an existing timestamp notice to be modified, a conflict can be detected when attempting to modify the end timestamp of the notice responsive to processing of a transaction. However, there may be no old notice to modify. According to an example, the update memo 124 can have a unique index built on the fields TableID, RecTxnId, and Key. Following this example, two transactions trying to modify the same record version end up trying to insert two timestamp notices in the update memo 124 with the same key value. The unique index on the update memo can be used to detect the violation, causing and one of the transactions to abort.

Moreover, the control component 204 can include an update component 808 that can update a record in the secondary storage 112 by deleting the old version from the secondary storage 112 and inserting a new version into the primary storage 110. The new version, for example, may be later migrated into the secondary storage 112 (e.g., by the migration component 804); however, the update component 808 inhibits new versions of records being directly inserted into the secondary storage 112. Moreover, as discussed above in connection with the insertion component 802, new records are similarly inserted into the primary storage 110.

New records and new version of records are inserted into the primary storage 110 as opposed to the secondary storage 112 since a new record can be considered to be hot and updating a record (creating a new version of a record) can be interpreted as a signal that the record is (potentially) becoming hot. Inserting the new records and the new versions in the primary storage 110 allows a scan validation, performed for serializable transactions, to be executed in the primary storage 110 (e.g., in the memory 104). Scan validation checks for new records satisfying a scan predicate that have appeared since a transaction began. By inserting modified and new records in the primary storage 110, the secondary storage 112 need not be checked as part of the scan validation.

The control component 204 can further include a read component 810 that can read a record from the secondary storage 112 (as part of a transaction). The read component 810 can determine whether to access the secondary storage 112 for the record using the access filter 210. The read component 810 can use a point lookup or scan to probe the in-memory access filter 210 to determine whether to access the secondary storage 112. If the access filter 210 specifies to access the secondary storage 112 based upon the probe, then the read component 810 can read the record. Responsive to determining to access the secondary storage 112 for the record, the read component 810 can retrieve the record from the secondary storage 112. The read component 810 can further search the update memo 124 for a matching timestamp notice for the record. Timestamps for the record can be set by the read component 810 based upon whether the matching timestamp notice is found and data indicated by the matching timestamp notice (if found). The read component 810 can further insert the record with the timestamps into the private cache 122 for the transaction.

The below exemplary algorithm (Algorithm 3) can be employed at least in part by the read component 810 to read the record from the secondary storage 112; yet, the claimed subject matter is not limited to the example set forth in this algorithm, which is provided for illustration purposes.

---
Algorithm 3: ReadColdRecord
---

1. Read the target record from secondary storage into an I/O buffer.
2. Pad the record to the format of in-memory records (e.g., determine a correct position of the timestamp fields before the record in the buffer).
3. Let B and E be local variables. Set B = 1 and E = infinity.
4. Look for a matching (and visible) notice in the update memo (using the TxnId and Key fields from the record).
5. If a timestamp notice Ntc is found in the update memo then:
   5.1. If Ntc is of type N, return a null pointer.
   5.2. If Ntc is of type B, set B = Ntc.Begin, E = infinity.
   5.3. If Ntc is of type BE, set B = Ntc.BTsCopy, E = Ntc.Begin.
   5.4. If Ntc is of type E, set B = 1, E = Ntc.Begin.
6. Endif
7. Copy B and E into the timestamp fields in the I/O buffer. Set the first link field to COLD.
8. Check whether the record in the buffer is visible and satisfied user-defined filter functions.
9. If the record does not qualify, return Null.
10. Copy the record from the buffer into a private cache for the transaction. Set a NoticePtr for the record to point to Ntc in the update memo.
11. Return a pointer to the cached copy.

In step 1 of Algorithm 3, the read component 810 can read the record from the secondary storage 112 into an I/O buffer. In step 2, the read component 810 can pad the record so the record has a form that is similar to a format of in-memory records. At step 4, the read component 810 can look for a matching timestamp notice in the update memo 124. If a timestamp notice of type N is found (step 5.1), the record is ignored. Otherwise, the begin timestamp and end timestamp of the timestamp notice are set (depending upon the type of the notice, steps 5.2-5.4). At step 8, the read component 810 checks whether the record is visible and passes user-defined filter function(s). If the record is visible and passes the filter function(s), the record is copied by the read component 810 into the private cache 122 for the transaction and a pointer to the cached record is returned to the transaction.

The control component 204 can further include a cleaner component 812 that can clean the secondary storage 112 and/or the update memo 124. Migrating records to the secondary storage 112 and updating or deleting records in the secondary storage 112 adds timestamp notices to the update memo 124. Records that are deleted from the secondary storage 112 (e.g., performed by the deletion component 806) may not be physically removed from the secondary storage 112 responsive to the deletion. Accordingly, the cleaner component 812 can remove stale timestamp notices from the update memo 124. Similarly, the cleaner component 812 can remove records in the secondary storage 112 that are no longer visible to any transactions.

The cleaner component 812, for example, can periodically clean timestamp notices no longer visible to active transactions from the update memo 124. While the cleaner component 812 performs such cleaning, the migration component 804 can block migration of records. Exemplary Algorithm 4, set forth below, provides an example of an algorithm that can be performed by at least in part by the cleaner component 812 to clean the update memo 124; again, it is to be appreciated that the claimed subject matter is not limited to the following exemplary algorithm.

---
Algorithm 4: CleanUpdateMemo
---

1. Set TSBound to the begin timestamp of the oldest active (uncommitted) transaction in the system.
2. For each committed notice Ntc in the update memo do
   2.1. DelFlag = false
   2.2. // Remove records visible to nobody
   2.3. If Ntc is of type N or ((of type BE or E) and Ntc.Begin < TSBound) then
      2.3.1. Delete the record covered by Ntc from the secondary storage.
      2.3.2. DelFlag = true
   2.4. Endif
   2.5. If Ntc is of type B and Ntc.Begin < TSBound then DelFlag = true
   2.6. // Delete the notice
   2.7. If DelFlag = true then
      2.7.1 Begin transaction
      2.7.2. Delete Ntc from the update memo
      2.7.3. Commit transaction
   2.8. Endif The cleaner component 812 can scan through the update memo 124 to check committed notices. As set forth above, the action taken depends on the type of the notice. An N type notice indicates a failed insert into the secondary storage 112. The associated record is not visible for any transaction, such record can be removed, and the notice can be deleted.

A notice of type BE or E corresponds to a (logically) deleted records. If the record was deleted before the begin timestamp of the oldest active transaction (TSBound), such record is not visible to current or future transactions. Accordingly, the cleaner component 812 can remove such record from the secondary storage 112 and delete the notice from the update memo 124.

A notice of type B corresponds to a currently visible record (e.g., end timestamp is infinity). If a begin timestamp of the corresponding notice is earlier than the begin timestamp of the oldest active transaction (TSBound), the record is visible to all current and future transactions. If so, the cleaner component 812 can delete the notice. In this scenario, the record remains in the secondary storage 112 with no notice. A record with no notice gets default timestamps (1, infinity) when later read by the read component 810).

The deletion of a notice can be performed by the cleaner component 812 in a transaction that begins after the corresponding cold record, if any, has been deleted (e.g., delete flags can be set, step 2.7 of Algorithm 4 can delete notice(s)

in a subsequent transaction). By using separate transactions, a situation where a notice is deleted but a corresponding record is not can be mitigated.

Moreover, the control component 204 can include a validation component 814. An update transaction running at repeatable read or serializable isolation can be validated before it commits. If validation fails, the transaction aborts.

For both repeatable read and serializable isolation, the validation component 814 can verify that records read as part of execution of the transaction have not been updated or deleted by another transaction before commit. In a memory-only scenario, such verification can be performed by keeping pointers to record reads. Under such scenario, at commit time, a test can be performed to verify that the read versions remain visible as of the commit time. If the versions are still visible, then other transaction(s) have not changed the versions during the lifetime of the validating transaction.

With cold records, more than one copy of the record can be stored. Moreover, as described herein, updates to cold records are performed using the update memo 124. Accordingly, the validation component 814 can employ a similar test as compared to the memory-only scenario, where the validation component 814 can adjust the end timestamp of the records in the private cache 122 of the transaction before performing the visibility check. The validation component 814 can update end timestamps of cached records after processing (e.g., normal processing) of the transaction and prior to a beginning of validation of a transaction, with the end timestamps being updated based upon timestamp notices that respectively correspond to the cached records from the update memo 124.

The following exemplary algorithm (Algorithm 5) describes updating the end timestamp of a cached record Rc, which can be performed by the validation component 814. Recall that Rc is prefixed with a NoticePtr field that is either null or points to the notice used when the record was read. Again, it is contemplated that Algorithm 5 is provided for illustration purposes, and the claimed subject matter is not limited to such algorithm.

and commits; 3) TxM (Migrate) migrates the newly inserted record to the secondary storage 112 and commits; and 4) TxS validates by repeating the scan over the primary storage 110, where the newly inserted record may not be visible because the version in the primary storage 110 has been migrated.

To mitigate the foregoing, the validation component 814 can enforce an additional constraint on migrating records. When the migration transaction starts, the validation component 814 can compute TsBoundSer, the begin timestamp of the oldest serializable transaction that is active (uncommitted) in the system. A migration transaction may not migrate a record with a begin timestamp later than TsBoundSer. Accordingly, a newly inserted record in the primary storage 110 can remain until the serializable transaction validates.

In general, the storage interface component 120 can reduce a number of accesses to the secondary storage 112 (e.g., accesses of the secondary storage 112 may be slower than accesses of the primary storage 110). According to an example, within the database management system 108, the storage interface component 120 (e.g., the read component 810) can read a cold record from the secondary storage 112 to bring the record into memory (the private cache 122 of the transaction 202); thereafter, processing performed on the record can be performed in memory. By way of other examples, an update or delete of a cold record by the storage interface component 120 can include (a) a read from the secondary storage 112 to bring the record into memory (also to verify its existence) and (b) a delete to remove the record from secondary storage 112 (in case of an update the new version is placed in the primary storage 110 by the update component 808). The migration of a record from the primary storage 110 to the secondary storage 112 can include an insert into the secondary storage 112. Insert operations (e.g., performed by the insertion component 802) place a new record in the primary storage 110, thus do not incur an access to the secondary storage 112. Moreover, the update memo

---

Algorithm 5: PrepareValidationTimestamp

1. Let Rc be a pointer to a record in the private cache of a transaction.
2. If Rc.NoticePtr is not null, copy into an end timestamp of Rc one of the following:
    2.1. If the notice is of type E, copy from a begin timestamp of the notice.
    2.2. If the notice is of type BE, copy a value from the BTsCopy field of the notice.

---

For a serializable update transaction, the validation component 814 can validate scans of a transaction to detect phantoms. In a memory-only scenario, validation can be performed by repeating the scan against the main-memory index and checking whether new records have appeared. Repeating a scan in the secondary storage 112 can be expensive. Accordingly, repeating scans against the secondary storage 112 can be mitigated by the storage interface component 120 since newly inserted records and new versions of records resulting from an update of a cold record can be directly inserted into the primary storage 110 (rather than the secondary storage 112). Accordingly, a scan of the primary storage 110 can be employed to detect phantoms.

However, a serializable transaction may fail in various scenario. Examples of such scenarios can include: 1) TxS (Serializable) scans the table, where TxS is still active; 2) TxI (Insert) inserts a new record to the primary storage 110

124 and the private cache 122 can enable validation and post-processing to occur in memory.

Figure 11:
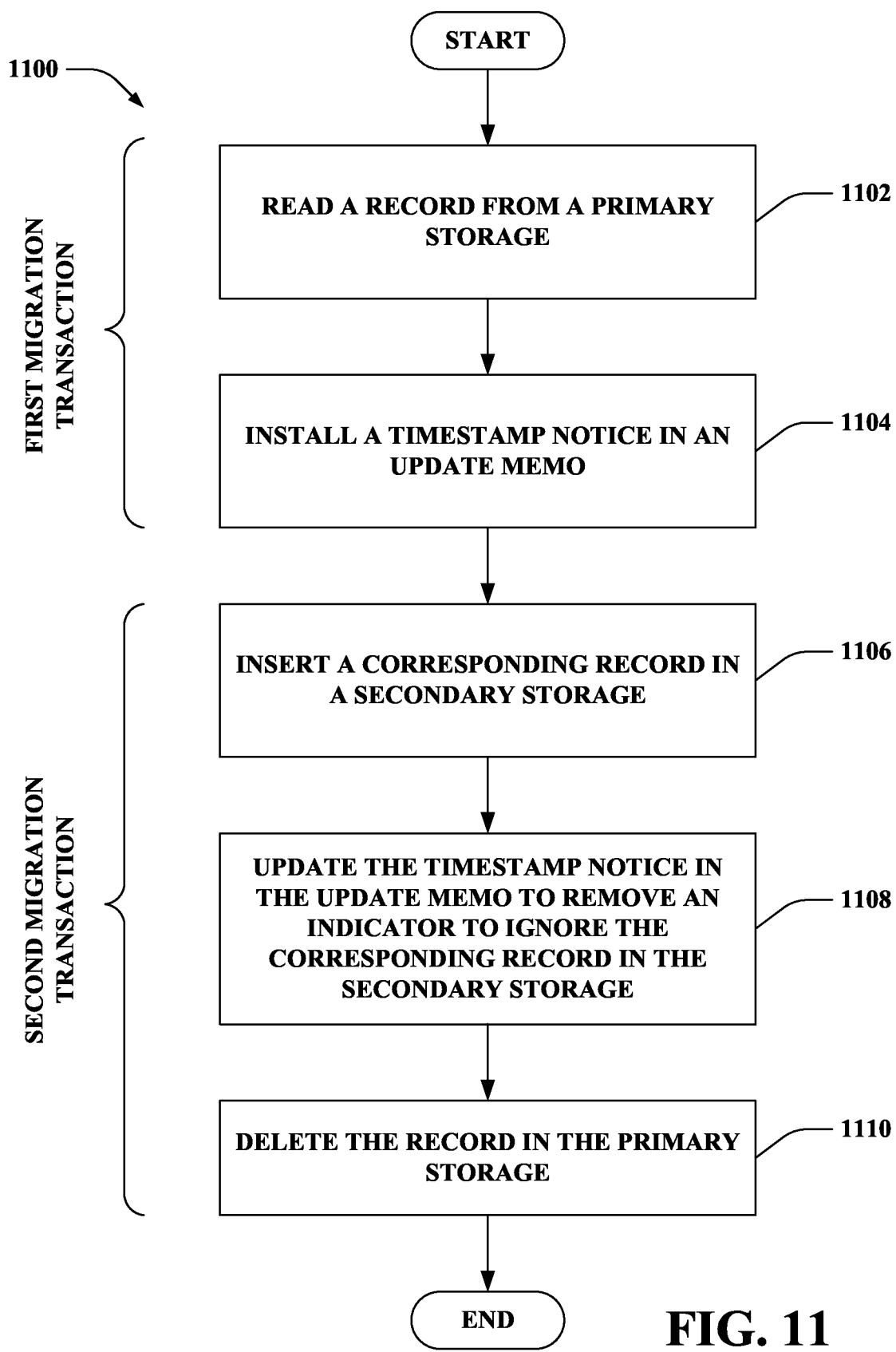
FIG. 11 is a flow diagram that illustrates an exemplary methodology of migrating a record from a primary storage to a secondary storage.
Figure 12:
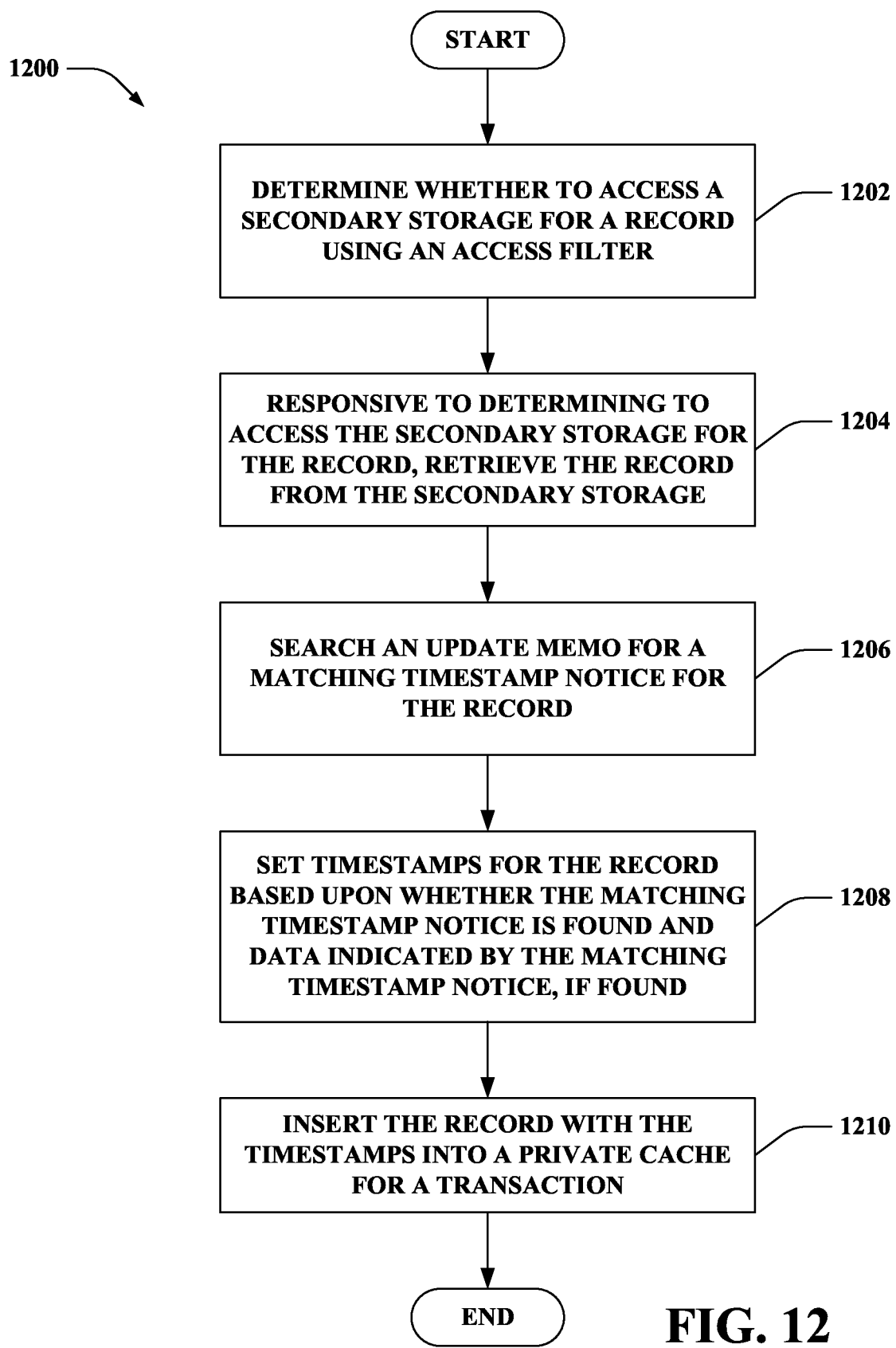
FIG. 12 is a flow diagram that illustrates an exemplary methodology of reading a record of a database as part of processing a transaction.

FIGS. 11-12 illustrate exemplary methodologies relating to performing one or more operations on records of a database (e.g., an in-memory database). While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 11 illustrates a methodology 1100 of migrating a record from a primary storage to a secondary storage. Migration of the record can use a first migration transaction and a second migration transaction. Acts 1102 and 1104 can be performed during processing of the first migration transaction. At 1102, a record can be read from the primary storage. At 1104, a timestamp notice can be installed in an update memo. Memory can include the update memo. Moreover, the timestamp notice can include an indicator to ignore a corresponding record in the secondary storage, where the corresponding record pertains to the first record (e.g., a copy of at least a portion of the first record).

Further, acts 1106, 1108, and 1110 can be performed during processing of the second migration transaction. At 1106, the corresponding record can be inserted in the secondary storage. At 1108, the timestamp notice in the update memo can be updated to remove the indicator to ignore the corresponding record in the secondary storage. At 1110, the first record can be deleted in the primary storage.

Turning to FIG. 12, illustrated is a methodology 1200 of reading a record of a database as part of processing a transaction. At 1202, a determination can be made concerning whether to access a secondary storage for the record. The determination can be performed using an access filter, which can be retained in memory. At 1204, responsive to determining to access the secondary storage for the record, the record can be retrieved from the secondary storage. At 1206, an update memo can be searched for a matching timestamp notice for the record. The memory can include the update memo, and the update memo can include timestamp notices that specify statuses of records of the database having updates that span the primary storage and the secondary storage. At 1208, timestamps for the record can be set based upon whether the matching timestamp notice is found and data indicated by the matching timestamp notice, if found. At 1210, the record with the timestamps can be inserted into a private cache for the transaction.

Figure 13:
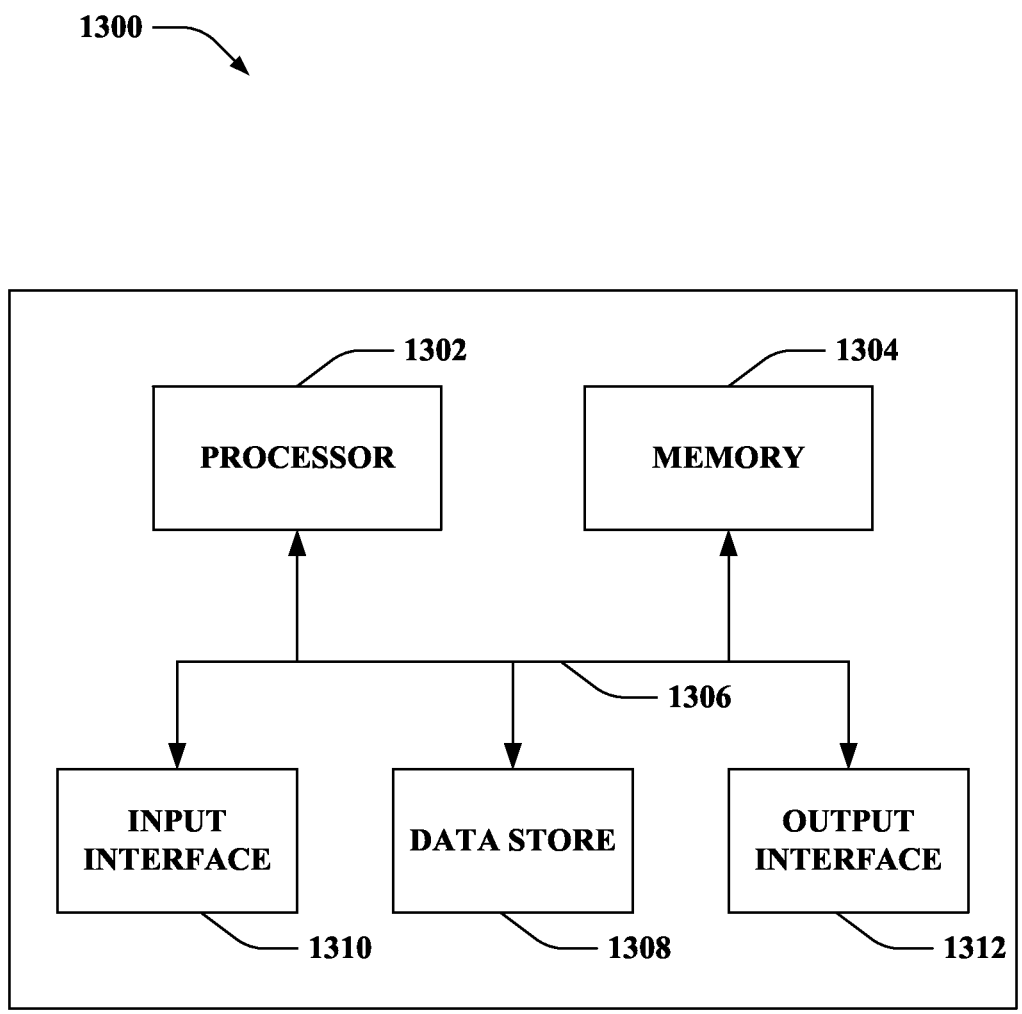
FIG. 13 illustrates an exemplary computing device.

Referring now to FIG. 13, a high-level illustration of an exemplary computing device 1300 that can be used in accordance with the systems and methodologies disclosed herein is illustrated. For instance, the computing device 1300 may be used in a system that accesses records of a database that are split between primary storage and secondary storage. The computing device 1300 includes at least one processor 1302 that executes instructions that are stored in a memory 1304. The instructions may be, for instance, instructions for implementing functionality described as being carried out by one or more components discussed above or instructions for implementing one or more of the methods described above. The processor 1302 may access the memory 1304 by way of a system bus 1306. In addition to storing executable instructions, the memory 1304 may also store an update memo (e.g., timestamp notices), primary storage (e.g., a first subset of records of a database retained as part of the primary storage), private cache(s), access filter(s), and so forth.

The computing device 1300 additionally includes a data store 1308 that is accessible by the processor 1302 by way of the system bus 1306. The data store 1308 may include executable instructions, a secondary storage (e.g., a second subset of the records of the database retained as part of the secondary storage), etc. The computing device 1300 also includes an input interface 1310 that allows external devices to communicate with the computing device 1300. For instance, the input interface 1310 may be used to receive instructions from an external computer device, from a user, etc. The computing device 1300 also includes an output interface 1312 that interfaces the computing device 1300 with one or more external devices. For example, the computing device 1300 may display text, images, etc. by way of the output interface 1312.

It is contemplated that the external devices that communicate with the computing device 1300 via the input interface 1310 and the output interface 1312 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1300 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1300 may be a distributed system. Thus, for instance, several devices may be in communication by way of a network connection and may collectively perform tasks described as being performed by the computing device 1300.

Figure 14:
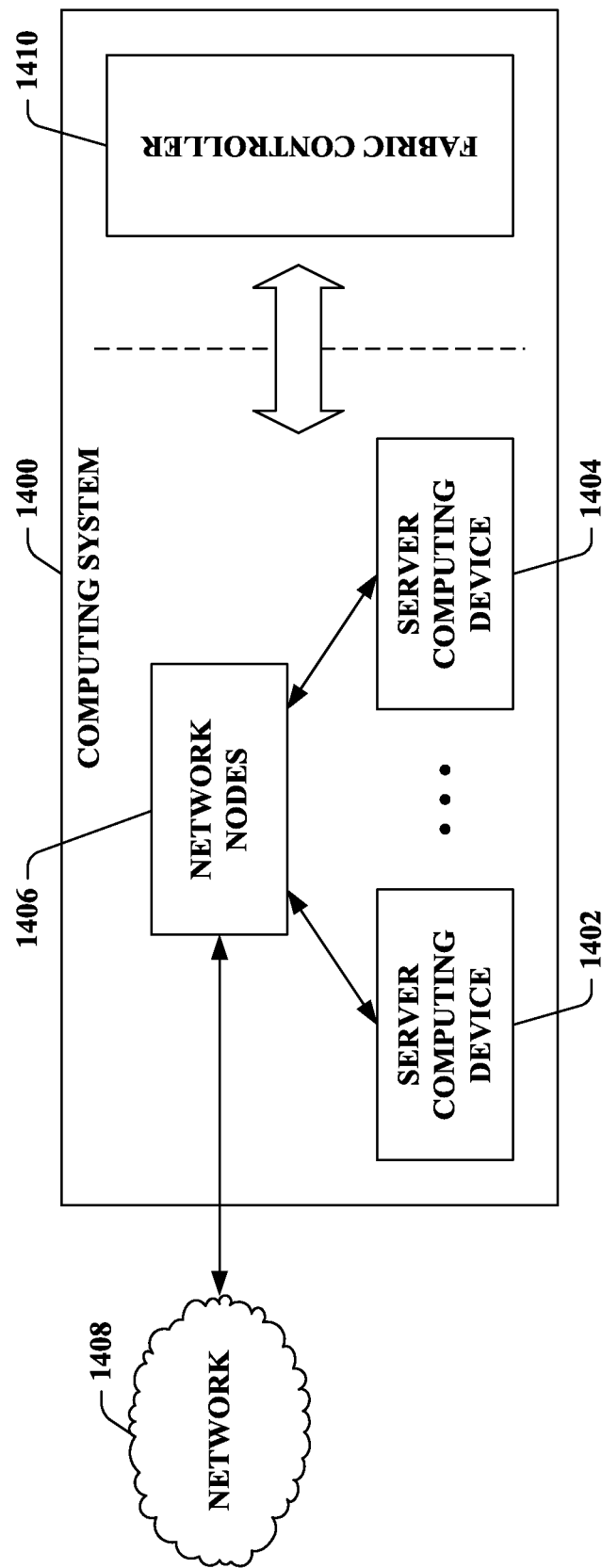
FIG. 14 illustrates an exemplary computing system.

Turning to FIG. 14, a high-level illustration of an exemplary computing system 1400 that can be used in accordance with the systems and methodologies disclosed herein is illustrated. For instance, the computing system 1400 can be or include the computing system 100. Additionally or alternatively, the computing system 100 can be or include the computing system 1400.

The computing system 1400 includes a plurality of server computing devices, namely, a server computing device 1402, . . . , and a server computing device 1404 (collectively referred to as server computing devices 1402-1404). The server computing device 1402 includes at least one processor and a memory; the at least one processor executes instructions that are stored in the memory. The instructions may be, for instance, instructions for implementing functionality described as being carried out by one or more components discussed above or instructions for implementing one or more of the methods described above. Similar to the server computing device 1402, at least a subset of the server computing devices 1402-1404 other than the server computing device 1402 each respectively include at least one processor and a memory. Moreover, at least a subset of the server computing devices 1402-1404 include respective data stores.

Processor(s) of one or more of the server computing devices 1402-1404 can be or include the processor 102. Further, a memory (or memories) of one or more of the server computing devices 1402-1404 can be or include the memory 104. Moreover, a data store (or data stores) of one or more of the server computing devices 1402-1404 can be or include the data store 106.

The computing system 1400 further includes various network nodes 1406 that transport data between the server computing devices 1402-1404. Moreover, the network nodes 1402 transport data from the server computing devices 1402-1404 to external nodes (e.g., external to the computing system 1400) by way of a network 1408. The network nodes 1402 also transport data to the server computing devices 1402-1404 from the external nodes by way of the network 1408. The network 1408, for example, can be the Internet, a cellular network, or the like. The network nodes 1406 include switches, routers, load balancers, and so forth.

A fabric controller 1410 of the computing system 1400 manages hardware resources of the server computing devices 1402-1404 (e.g., processors, memories, data stores, etc. of the server computing devices 1402-1404). The fabric controller 1410 further manages the network nodes 1406. Moreover, the fabric controller 1410 manages creation, provisioning, de-provisioning, and supervising of virtual machines instantiated upon the server computing devices 1402-1404.

Various examples are now set forth.

Example 1

A computing system, comprising: a processor; a memory that comprises a primary storage, the primary storage comprises a first subset of records of a database, the database being an in-memory database; and a data store that comprises a secondary storage, the secondary storage comprises a second subset of the records of the database; the memory further comprises: an update memo that comprises timestamp notices that specify statuses of records of the database having updates that span the primary storage and the secondary storage; and a database management system that is executable by the processor, the database management system processes a transaction, the database management system further comprises: a storage interface component that accesses a record of the database for the transaction based on at least one of the timestamp notices of the update memo.

Example 2

The computing system according to Example 1, the memory further comprises a private cache reserved for the transaction, the private cache comprises a copy of the record for the transaction, wherein the storage interface component reads the record from the secondary storage and stores the copy of the record in the private cache.

Example 3

The computing system according to Example 2, the private cache reserved for the transaction being separate from a differing private cache reserved for a differing transaction.

Example 4

The computing system according to any of Examples 1-3, the storage interface component provides a unified interface for accessing the records of the database, the storage interface component further obscures a split of the records of the database between the primary storage and the secondary storage.

Example 5

The computing system according to any of Examples 1-4, the memory further comprises an access filter that comprises a summary of contents of at least a portion of the secondary storage, the storage interface component checks the access filter to identify whether to access the secondary storage.

Example 6

The computing system according to Example 5, the access filter comprises at least one of a Bloom filter or a range filter.

Example 7

The computing system according to any of Examples 1-6, the storage interface component further comprises a control component that manages performance of an operation upon the record.

Example 8

The computing system according to any of Examples 1-7, the storage interface component further comprises a migration component that migrates the record from the primary storage to the secondary storage, the migration component migrates the record using a first migration transaction and a second migration transaction, wherein: during processing of the first migration transaction, the migration component: reads the record from the primary storage; and installs a timestamp notice in the update memo, the timestamp notice comprises an indicator to ignore a corresponding record in the secondary storage, the corresponding record pertains to the record; and during processing of the second migration transaction, the migration component: inserts the corresponding record in the secondary storage; updates the timestamp notice in the update memo to remove the indicator to ignore the corresponding record in the secondary storage; and deletes the record in the primary storage.

Example 9

The computing system according to any of Examples 1-8, the storage interface component further comprises a migration component that migrates the record while the database is online and active, the migration component at least one of migrates the record from the primary storage to the secondary storage or migrates the record from the secondary storage to the primary storage.

Example 10

The computing system according to any of Examples 1-9, the storage interface component further comprises a deletion component that deletes the record from the secondary storage, the deletion component: reads the record from the secondary storage; searches the update memo for a matching timestamp notice for the record; and marks the record logically deleted in the update memo responsive to searching for the matching timestamp notice, the deletion component one of: updates the matching timestamp notice in the update memo for the record, if found; or inserts a new timestamp notice in the update memo for the record, if not found.

Example 11

The computing system according to any of Examples 1-10, the storage interface component further comprises a read component that reads the record from the secondary storage, the read component: determines whether to access the secondary storage for the record using an in-memory access filter; responsive to determining to access the secondary storage for the record, retrieves the record from the secondary storage; searches the update memo for a matching timestamp notice for the record; sets timestamps for the record based upon whether the matching timestamp notice is found and data indicated by the matching timestamp notice, if found; and inserts the record with the timestamps into a private cache for the transaction.

Example 12

The computing system according to any of Examples 1-11, the storage interface component further comprises a cleaner component that periodically cleans timestamp notices no longer visible to active transactions from the update memo.

Example 13

The computing system according to any of Examples 1-12, the storage interface component further comprises a validation component that updates end timestamps of cached records after processing of the transaction and prior to a beginning of validation of the transaction, the end timestamps being updated based upon timestamp notices that respectively correspond to the cached records from the update memo.

Example 14

The computing system according to any of Examples 1-13, the storage interface component inserts, into the primary storage: a new record; and a new version of the record resulting from an update of the record, the secondary storage comprises the record.

Example 15

A method of performing one or more operations on records of a database, a memory comprises a primary storage and a data store comprises a secondary storage, the primary storage comprises a first subset of the records of the database and the secondary storage comprises a second subset of the records of the database, the method comprising: during processing of a first migration transaction: reading a first record from the primary storage; and installing a timestamp notice in an update memo, the memory comprises the update memo, the timestamp notice comprises an indicator to ignore a corresponding record in the secondary storage, the corresponding record pertains to the first record; and during processing of a second migration transaction: inserting the corresponding record in the secondary storage; updating the timestamp notice in the update memo to remove the indicator to ignore the corresponding record in the secondary storage; and deleting the first record in the primary storage.

Example 16

The method according to Example 15, further comprising deleting a second record from the secondary storage, further comprising: reading the second record from the secondary storage; searching the update memo for a matching timestamp notice for the second record; and marking the second record logically deleted in the update memo responsive to searching for the matching timestamp notice by one of: updating the matching timestamp notice in the update memo for the record, if found; or inserting a new timestamp notice in the update memo for the record, if not found.

Example 17

The method according to any of Examples 15-16, further comprising reading a second record from the secondary storage, further comprising: determining whether to access the secondary storage for the second record using an in-memory access filter; responsive to determining to access the secondary storage for the second record, retrieving the second record from the secondary storage; searching the update memo for a matching timestamp notice for the second record; setting timestamps for the second record based upon whether the matching timestamp notice is found and data indicated by the matching timestamp notice, if found; and inserting the second record with the timestamps into a private cache.

Example 18

The method according to any of Examples 15-17, the update memo comprises timestamp notices that specify statuses of records of the database having updates that span the primary storage and the secondary storage.

Example 19

The method of according to any of Examples 15-18, the database being an in-memory database.

Example 20

A method of reading a record of a database as part of processing a transaction, a memory comprises a primary storage and a data store comprises a secondary storage, the primary storage comprises a first subset of the records of the database and the secondary storage comprises a second subset of the records of the database, the method comprising: determining whether to access the secondary storage for the record using an access filter, the memory comprises the access filter; responsive to determining to access the secondary storage for the record, retrieving the record from the secondary storage; searching an update memo for a matching timestamp notice for the record, the memory comprises the update memo, the update memo comprises timestamp notices that specify statuses of records of the database having updates that span the primary storage and the secondary storage; setting timestamps for the record based upon whether the matching timestamp notice is found and data indicated by the matching timestamp notice, if found; and inserting the record with the timestamps into a private cache for the transaction.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system, comprising:
    a processor;
    a memory that comprises a primary storage, the primary storage comprises a first subset of records of a database, the database being an in-memory database; and
    a data store that comprises a secondary storage, the secondary storage comprises a second subset of the records of the database;
    the memory further comprises:
        an update memo that comprises timestamp notices that specify statuses of records of the database having updates that span the primary storage and the secondary storage; and
        a database management system that is executable by the processor, the database management system processes a transaction, the database management system further comprises:
            a storage interface that migrates a first record of the database based on at least one of the timestamp notices of the update memo, the first record being migrated from the primary storage to the secondary storage using a first migration transaction and a second migration transaction, wherein:
                during processing of the first migration transaction, the storage interface:
                    reads the first record from the primary storage; and
                    installs a timestamp notice in the update memo, the timestamp notice comprises an indicator to ignore a corresponding record in the secondary storage, the corresponding record pertains to the first record; and
                during processing of the second migration transaction, the storage interface:
                    inserts the corresponding record in the secondary storage;
                    updates the timestamp notice in the update memo to remove the indicator to ignore the corresponding record in the secondary storage; and
                    deletes the first record in the primary storage.

2. The computing system of claim 1, wherein:
    the storage interface further accesses a second record of the database for the transaction based on at least one of the timestamp notices of the update memo; and
    the memory further comprises a private cache reserved for the transaction, the private cache comprises a copy of the second record for the transaction, wherein the storage interface reads the second record from the secondary storage and stores the copy of the second record in the private cache.

3. The computing system of claim 2, the private cache reserved for the transaction being separate from a differing private cache reserved for a differing transaction.

4. The computing system of claim 1, the storage interface provides a unified interface for accessing the records of the database, the storage interface further obscures a split of the records of the database between the primary storage and the secondary storage.

5. The computing system of claim 1, the memory further comprises an access filter that comprises a summary of contents of at least a portion of the secondary storage, the storage interface checks the access filter to identify whether to access the secondary storage.

6. The computing system of claim 5, the access filter comprises at least one of a Bloom filter or a range filter.

7. The computing system of claim 1, the storage interface further:
    accesses a second record of the database for the transaction based on at least one of the timestamp notices of the update memo; and
    manages performance of an operation upon the second record.

8. The computing system of claim 1, the storage interface migrates the first record while the database is online and active.

9. The computing system of claim 1, the storage interface further deletes a second record from the secondary storage, wherein, to delete the second record, the storage interface:
    reads the second record from the secondary storage;
    searches the update memo for a matching timestamp notice for the second record; and
    marks the second record logically deleted in the update memo responsive to searching for the matching timestamp notice, wherein, to mark the second record logically deleted, the storage interface one of:
  updates the matching timestamp notice in the update memo for the second record, if found; or
  inserts a new timestamp notice in the update memo for the second record, if not found.

10. The computing system of claim 1, the storage interface further reads a second record from the secondary storage, wherein, to read the second record, the storage interface:
  determines whether to access the secondary storage for the second record using an in-memory access filter;
  retrieves the second record from the secondary storage;
  searches the update memo for a matching timestamp notice for the second record;
  sets timestamps for the second record based upon whether the matching timestamp notice is found and data indicated by the matching timestamp notice, if found; and
  inserts the second record with the timestamps into a private cache.

11. The computing system of claim 1, the storage interface further periodically cleans timestamp notices no longer visible to active transactions from the update memo.

12. The computing system of claim 1, the storage interface further updates end timestamps of cached records after processing of the transaction and prior to a beginning of validation of the transaction, the end timestamps being updated based upon timestamp notices that respectively correspond to the cached records from the update memo.

13. The computing system of claim 1, wherein the secondary storage comprises a second record, and the storage interface inserts, into the primary storage:
  a new record; and
  a new version of the second record resulting from an update of the second record.

14. The computing system of claim 1, wherein the storage interface uses the update memo to maintain transactional consistency of the records of the database having updates that span the primary storage and the secondary storage.

15. A computing system, comprising:
  a processor;
  a memory that comprises a primary storage, the primary storage comprises a first subset of records of a database, the database being an in-memory database; and
  a data store that comprises a secondary storage, the secondary storage comprises a second subset of the records of the database;
  the memory further comprises:
    an update memo that comprises timestamp notices that specify statuses of records of the database having updates that span the primary storage and the secondary storage; and
    a database management system that is executable by the processor, the database management system processes a transaction, the database management system further comprises:
      a storage interface that deletes a first record from the secondary storage as part of the transaction;
      wherein, to delete the first record from the secondary storage, the storage interface marks the first record logically deleted using a timestamp notice in the update memo; and
      wherein the first record is physically removed from the secondary storage when the timestamp notice is no longer visible to active transactions from the update memo.

16. The computing system of claim 15, wherein, to delete the first record from the secondary storage, the storage interface further:
  reads the first record from the secondary storage; and
  searches the update memo for a matching timestamp notice for the first record;
  wherein the storage interface marks the first record logically deleted responsive to searching for the matching timestamp notice; and
  wherein the timestamp notice used to mark the first record logically deleted is one of:
    the matching timestamp notice in the update memo for the first record, if found; or
    a new timestamp notice in the update memo for the first record, if not found.

17. The computing system of claim 15, the storage interface further migrates a second record of the database based on at least one of the timestamp notices of the update memo, the second record being migrated at least one of from the primary storage to the secondary storage or from the secondary storage to the primary storage, wherein the storage interface uses the update memo to maintain transactional consistency of the records of the database having the updates that span the primary storage and the secondary storage.

18. The computing system of claim 17, the storage interface migrates the second record from the primary storage to the secondary storage using a first migration transaction and a second migration transaction, wherein:
  during processing of the first migration transaction, the storage interface:
    reads the second record from the primary storage; and
    installs a timestamp notice in the update memo, the timestamp notice comprises an indicator to ignore a corresponding record in the secondary storage, the corresponding record pertains to the second record; and
  during processing of the second migration transaction, the storage interface:
    inserts the corresponding record in the secondary storage;
    updates the timestamp notice in the update memo to remove the indicator to ignore the corresponding record in the secondary storage; and
    deletes the second record in the primary storage.

19. The computing system of claim 15, the storage interface further reads a second record from the secondary storage, wherein, to read the second record, the storage interface:
  determines whether to access the secondary storage for the second record;
  responsive to determining to access the secondary storage for the second record, retrieves the second record from the secondary storage;
  searches the update memo for a matching timestamp notice for the second record;
  sets timestamps for the second record based upon whether the matching timestamp notice is found and data indicated by the matching timestamp notice, if found; and
  inserts the second record with the timestamps into a private cache.

20. A computing system, comprising:
  a processor;
  a memory that comprises a primary storage, the primary storage comprises a first subset of records of a database, the database being an in-memory database; and a data store that comprises a secondary storage, the secondary storage comprises a second subset of the records of the database;

the memory further comprises:

an update memo that comprises timestamp notices that specify statuses of records of the database having updates that span the primary storage and the secondary storage; and a database management system that is executable by the processor, the database management system processes a transaction, the database management system further comprises:

a storage interface that reads a record from the secondary storage, wherein, to read the record, the storage interface:

determines whether to access the secondary storage for the record;

responsive to determining to access the secondary storage for the record, retrieves the record from the secondary storage;

searches the update memo for a matching timestamp notice for the record;

sets timestamps for the record based upon whether the matching timestamp notice is found and data indicated by the matching timestamp notice, if found; and inserts the record with the timestamps into a private cache.

* * * * *